(12) United States Patent
Sadato et al.

(10) Patent No.: US 9,527,271 B2
(45) Date of Patent: Dec. 27, 2016

(54) SEALING TAPE AND TEXTILE PRODUCT USING THE SAME

(75) Inventors: Hiroki Sadato, Tokyo (JP); Junichi Akimori, Tokyo (JP)

(73) Assignee: W. L. Gore & Associates, Co., Ltd., Tokyo (JP)

( * ) Notice: Subject to any disclaimer, the term of this patent is extended or adjusted under 35 U.S.C. 154(b) by 1126 days.

(21) Appl. No.: 11/992,268

(22) PCT Filed: Sep. 20, 2006

(86) PCT No.: PCT/JP2006/318644
§ 371 (c)(1),
(2), (4) Date: Nov. 7, 2008

(87) PCT Pub. No.: WO2007/034837
PCT Pub. Date: Mar. 29, 2007

(65) Prior Publication Data
US 2009/0233042 A1    Sep. 17, 2009

(30) Foreign Application Priority Data

Sep. 20, 2005    (JP) ................................ 2005-272803

(51) Int. Cl.
*B29C 65/50*    (2006.01)
*B32B 38/00*    (2006.01)
(Continued)

(52) U.S. Cl.
CPC .......... *B32B 38/0012* (2013.01); *A41D 27/24* (2013.01); *B29C 65/5021* (2013.01);
(Continued)

(58) Field of Classification Search
CPC ........ B32B 38/0012; B32B 27/12; B32B 5/02; B29C 66/712; B29C 66/73711; B29C 66/73715; B29C 66/71; B29C 65/5028; B29C 65/5021; B29C 65/5042; B29C 66/73713; B29C 66/73; D03D 3/005; D03D 15/00; D03D 15/0077; D03D 13/008; C09J 7/0296; A41D 27/24
See application file for complete search history.

(56) References Cited

U.S. PATENT DOCUMENTS 4,508,582 A *   4/1985   Fink ............................... 156/93
5,162,149 A     11/1992  Reaney ...................... 428/315.5
(Continued)

FOREIGN PATENT DOCUMENTS

EP    1 486 323    12/2004
EP    1 857 265    11/2007
(Continued)

OTHER PUBLICATIONS

English Machine Translation of JP H05-117602, obtained Jan. 12, 2010 from JPO.*
(Continued)

*Primary Examiner* — Nicholas Kokkinos
(74) *Attorney, Agent, or Firm* — Kilpatrick Townsend & Stockton, LLP

(57) ABSTRACT

Sealing Tapes adapted for bonding to a fabric laminated product are described herein. The sealing tapes exhibit a total cover factor of 1400 or less and exhibit a porous open structure having water resistance characteristics. In some embodiments, the sealing tape of the present invention comprises a base film and a woven fabric laminated on one side of the base film and an adhesive layer laminated on the other side of the base film.

20 Claims, 4 Drawing Sheets

(51) Int. Cl.
  *A41D 27/24* (2006.01)
  *B32B 5/02* (2006.01)
  *B32B 27/12* (2006.01)
  *C09J 7/02* (2006.01)
  *D03D 3/00* (2006.01)
  *D03D 13/00* (2006.01)
  *D03D 15/00* (2006.01)
  *B29C 65/00* (2006.01)
  *B29L 9/00* (2006.01)
  *B29C 65/10* (2006.01)
  *B29C 65/48* (2006.01)

(52) U.S. Cl.
  CPC ...... *B29C 65/5028* (2013.01); *B29C 65/5042* (2013.01); *B29C 66/71* (2013.01); *B29C 66/712* (2013.01); *B29C 66/73711* (2013.01); *B29C 66/73715* (2013.01); *B32B 5/02* (2013.01); *B32B 27/12* (2013.01); *C09J 7/0296* (2013.01); *D03D 3/005* (2013.01); *D03D 13/008* (2013.01); *D03D 15/00* (2013.01); *D03D 15/0077* (2013.01); *B29C 65/10* (2013.01); *B29C 65/483* (2013.01); *B29C 65/4815* (2013.01); *B29C 66/112* (2013.01); *B29C 66/1142* (2013.01); *B29C 66/135* (2013.01); *B29C 66/43* (2013.01); *B29C 66/727* (2013.01); *B29C 66/7292* (2013.01); *B29C 66/73712* (2013.01); *B29C 66/73713* (2013.01); *B29C 66/8612* (2013.01); *B29C 66/919* (2013.01); *B29C 66/9141* (2013.01); *B29C 66/91431* (2013.01); *B29C 66/9534* (2013.01); *B29L 2009/00* (2013.01); *C08G 2170/20* (2013.01); *C08G 2190/00* (2013.01); *C09J 2400/263* (2013.01); *C09J 2427/006* (2013.01); *C09J 2475/00* (2013.01); *D10B 2201/02* (2013.01); *D10B 2201/04* (2013.01); *D10B 2211/02* (2013.01); *D10B 2211/04* (2013.01); *D10B 2321/10* (2013.01); *D10B 2331/02* (2013.01); *D10B 2331/04* (2013.01); *D10B 2501/00* (2013.01); *D10B 2505/18* (2013.01); *Y10T 428/2405* (2015.01); *Y10T 428/249983* (2015.04); *Y10T 442/3179* (2015.04)

(56) References Cited

U.S. PATENT DOCUMENTS

| | | | |
|---|---|---|---|
| 6,294,487 B1 | 9/2001 | Keshavaraj | 442/218 |
| 7,682,997 B2* | 3/2010 | Altman | A41D 31/0027 442/397 |
| 2004/0258904 A1* | 12/2004 | Uemoto | B32B 27/08 428/318.4 |
| 2005/0081281 A1* | 4/2005 | Hannon et al. | 2/275 |

FOREIGN PATENT DOCUMENTS

| | | |
|---|---|---|
| GB | 2 350 073 | 11/2000 |
| JP | 62-252495 A | 11/1987 |
| JP | 3-7787 | 1/1991 |
| JP | 3-7788 A | 1/1991 |
| JP | 5-0117602 A | 5/1993 |
| JP | 5-508668 | 12/1993 |
| JP | 8-325885 A | 12/1996 |
| JP | 11-279903 A | 10/1999 |
| JP | 2002-249730 | 9/2002 |
| JP | 2003-96640 A | 4/2003 |
| JP | 2003-311862 | 6/2003 |
| JP | 2003-236963 | 9/2003 |
| JP | 2006-248052 | 9/2006 |
| WO | WO 01/60602 | 8/2001 |

OTHER PUBLICATIONS

English Machine Translation of JP H08-325885, obtained Jan. 12, 2010 from JPO.*
English Machine Translation of JP 2003-096640, obtained Jan. 12, 2010 from JPO.*
English Machine Translation of JP 2002-249730, obtained Jan. 12, 2010 from JPO.*
Full translations have been ordered and will be forwarded to the USPTO upon receipt. An English abstract is attached at this time.
European Supplementary Search Report EP06810340 dated Mar. 19, 2010.
English Machine Translation of JP2003-096640, obtained Jan. 12, 2010 from JPO.
English Machine Translation of JP2002-249730, obtained Jan. 12, 2010 from JPO.

* cited by examiner

Cross section of Joint (X-X' cross section view)

Cross section of Joint (X-X' cross section view)

SEALING TAPE AND TEXTILE PRODUCT USING THE SAME

TECHNICAL FIELD

The present invention relates to sealing tapes; and textile products such as garments, sheets, tents, and sleeping bags using the sealing tapes.

BACKGROUND ART

For textile products such as garment, sheets, tents, bags, and, sleeping bags which are used in applications where waterproof property, dust-proof property, wind-proof property or the like are required, generally used is a layered cloth having a double layer structure where a fabric such as woven fabric and knit is laminated as a face fabric on a protective lining (such as waterproof coating and waterproof film) or having a three-layer structure where a tricot knit is layered on the other side (back side) of the protective lining.

The waterproof layered cloth having the double layer structure has a waterproof film consisting of a polyurethane resin or the like on the side which touches the skin, i.e, as a back fabric, and thus is poor in sense in the skin when getting wet in water or sweating. Therefore, when the waterproof layered cloth having the double layer structure is used, a back fabric such as a mesh knit and a taffeta woven fabric is generally employed and laminated. However, in this method, the feeling of the back fabric is poor, since the back fabric clings to the skin, and the air space between the skin and the outer air (a space formed between the waterproof layered cloth and the back fabric) becomes large, so that there occur problems in that moisture permeability when wearing the cloth becomes lowered and becomes too bulky to be stored compactly. Therefore, in recent years, in order to pursue lightweight properties and portability of the product and, at the same time, to reduce sense in the skin and stuffy feeling, layered cloths having a three-layer structure laminated with a tricot knit have been commonly used as the back fabric of the layered waterproof film.

In a case that a waterproof layered cloth having a three-layer structure is processed into a textile product, a sealing tape is used for a sealing treatment of a joint thereof such as a stitch and a seam. The sealing treatment means sealing a space formed at the joint of the textile product with a resin; for example, in a case of a rainwear which is required to have a waterproof property, the treatment is carried out in order to prevent rainwater from coming inside from a space formed at the joint of the waterproof layered cloth. Usually, the sealing tape has a three-layer structure in which a cloth is laminated on one side of the base film and an adhesive layer is laminated on the other side. As the cloth laminated in the sealing tape, a tricot knit which has the same appearance as that of the waterproof layered cloth having a three-layer structure is used to make the appearance of the sealing tape consistent with the appearance of the back fabric of the waterproof layered cloth and improve the feeling to the skin.

For example, Japanese patent publication No. 2002-249730 A discloses a sealing tape having excellent adhesion and washing durability which can be used for sealing processing of cloths such as rainwear, skiwear, and mountain wear. In the sealing tape, a cloth is laminated on a heat-resistant layer of a resin layer consisting of a heat-resistant layer part and a hot melt layer part melting point at 120° C. or less and containing polyurethane as a main body with an adhesive. The hot melt layer part contains 1 to 30% of a polyester resin or a polyamide resin.

Japanese patent publication No. H11-279903 A discloses a sealing tape wherein a polyurethane resin is laminated on a tricot knit having the number of courses in a range of 40 to 60 per inch and comprising a nylon 66 fiber having a fineness of 15 to 30 denier via an adhesive layer.

Japanese patent publication No. H5-508668 A discloses a tape comprising an expanded and stretched porous polytetrafluoroethylene layer and a thermoplastic hot melt adhesive layer bonded to the porous polytetrafluoroethylene layer, wherein a thermosetting adhesive is coated on one side of the porous polytetrafluoroethylene and has a plurality of pores partially filled with the adhesive, and the side of the porous polytetrafluoroethylene which has not been coated with thermosetting adhesive is made to have high density, and thermoplastic hot melt adhesive layer is bonded to the side coated with thermosetting adhesive, which seals the seam to prevent penetration of liquid.

DISCLOSURE OF THE INVENTION

As described above, the sealing tape usually has a three-layer structure where a cloth is laminated on one side of the base film and an adhesive layer on the other side of the base film, and by heat-pressing the sealing tape put on a stitch or a seam area of a fabric laminated product and the like, the adhesive layer is melt and impregnated in the fabric laminated product and then is cooled to become solid, so that the fabric laminated product and the sealing tape are firmly fixed to each other. However, the cloth laminated on the base film of the sealing tape has a practical limitation that the knit must be laminated due to the following reasons.

First, without laminating the knit on the base film, in the part where the sealing tapes cross to each other (hereinafter, referred to as "crossing point" in some cases), impregnation of the adhesive layer laminated in the sealing tape of the second layer into the cloth laminated in the sealing tape of the first layer is lowered, so that a sufficient sealing effect at the crossing point cannot be achieved.

Second, in a case of processing the fabric laminated product into a garment, usually, the back fabric of the garment is often subjected to the sealing treatment; however, when the knit is not provided as the cloth of the sealing tape, the base film used for the sealing tape is exposed to touch the bare skin directly, so that the appearance and the touch feeling become lowered.

On the other hand, the sealing tape where the knit is laminated has a problem in that the mass of the knit becomes relatively large. If a reduction in weight is attempted by lowering the fineness and lowering the density, there is limitation in the reduction in weight, since the strength becomes insufficient and the knitted fabric becomes too thin so that the processing into a sealing tape cannot be carried out. Further, there is a problem of the knit in that a yarn constituting the knit is hooked due to abrasion with a shirt, a button, a VELCRO® fastening and the like to distort the structure, resulting in poor appearance and deterioration through abrasion. When the density of the knit is increased in order to solve these problems, the resultant sealing tape becomes heavy or the permeability of the adhesive layer of the second layer of the sealing tape with respect to the cloth of the sealing tape of the first layer at the crossing point becomes lowered, so that a sufficient sealing effect cannot be obtained.

Concavity and convexity are necessarily formed on a surface of the knit due to its structure, but when the knit is laminated on the base film of the sealing tape, contact points with the base film are reduced so that it is difficult to obtain sufficient adhesion to the base film. Therefore, when textile products using a sealing tape are repeatedly washed, there is a problem in that a knit is removed from an edge portion of the sealing tape so that appearance and durability become poor. When thickness and an amount of an adhesive for bonding the base film and the knit to bond them is increased, texture becomes hard, so that appearance and comfort of the product are damaged. Further, the knit is necessarily low in modulus and tensile strength due to its structure; thus, a sufficient bonding strength cannot be obtained even if a sealing tape laminated with a knit is used for a joint of a fabric laminated product subjected to fusion process without stitches.

The present invention has been achieved in view of the above circumstances. The object of the present invention is to overcome a practical restriction that a knit must be used on a surface of a sealing tape when the sealing tape is used for a textile product obtained by subjecting a fabric laminated product to sewing-processing or fusion process as well as providing a sealing tape which is excellent in durability, light-weighted and thin, and highly comfortable without undermining appearance and touch feeling.

The sealing tape of the present invention that has solved the above problem is a sealing tape comprising a base film, a woven fabric laminated on one side of the base film and an adhesive layer laminated on another side of the base film, wherein the woven fabric has a total cover factor ($CF_{total}$) of from 500 to 1400, calculated from the cover factors of the warp and the weft constituting the woven fabric according to the following formulae.

$$CF_{total} = CF_m + CF_t$$

$$CF_m = \sqrt{F_m} \times D_m$$

$$CF_t = \sqrt{F_t} \times D_t \qquad \text{[Formula 1]}$$

$CF_m$: cover factor of the warp
$CF_t$: cover factor of the weft
$F_m$: fineness (dtex) of the warp
$F_t$: fineness (dtex) of the weft
$D_m$: density of the warp (counts/2.54 cm)
$D_t$: density of the weft (counts/2.54 cm)

Namely, the gist of the present invention resides in improving the water resistance of the sealed portion (particularly the crossing point) as well as the appearance, reduction in weight and touch feeling when formed into a textile product by employing a woven fabric satisfying the above cover factor as the cloth laminated in the sealing tape to improve impregnation of the adhesive layer of the sealing tape of the second layer into the woven fabric laminated on the sealing tape of the first layer at the crossing point where the sealing tapes cross to each other (hereinafter, simply referred to as "impregnation at the crossing point" in some cases). It is preferable that at least one of the cover factor of the warp ($CF_m$) or the cover factor of the weft ($CF_t$) is in a range from 200 to 800.

It is preferred that at least one of the warp or the weft constituting the woven fabric is composed of two or more filaments. By using the warp or the weft composed of two or more filaments, the texture of the resultant sealing tape becomes soft. The preferable filament fineness is, for example, 12 dtex or less. By making the fineness per filament 12 dtex or less, the texture of the resultant sealing tape becomes softer.

It is preferred that at least one of the warp or the weft constituting the woven fabric is a long-fiber. It is because, by using the long-fiber, formation of fray on a surface of the woven fabric is suppressed to improve impregnation at the crossing point. Further, it is preferred that at least one of the warp and the weft constituting the woven fabric is a textured yarn. By a use of the textured yarn, impregnation at the crossing point is improved so that appearance and touch feeling is unlikely to be damaged even if the fiber density of the woven fabric is lowered.

With respect to the composition of the woven fabric, for example, a plain weave construction is preferred. By employing the plain weave construction, fiber density can be easily lowered, thereby improving impregnation at the crossing point.

As the base film, for example, when a film having a waterproof property is used, the waterproof property of the sealing treatment portion can be enhanced. As the film having the waterproof property, a porous film comprising a hydrophobic resin is preferable, and a porous polytetrafluoroethylene film is more preferable.

The porous film comprising the hydrophobic resin preferably has a hydrophilic resin layer on the side where the adhesive layer is laminated. If the porous film has the hydrophilic resin layer, a bonding strength of the porous film comprising the hydrophobic resin and the adhesive layer is improved.

As the adhesive for the sealing tape, for example, a hot melt adhesive is preferred. By using the hot melt adhesive, sealing treatment can be carried out easily. As the hot melt adhesive, a polyurethane resin is preferred. Additionally, a thickness of the adhesive layer of the sealing tape is preferably, for example, 120 μm or less. It is because, in any of the cases, the resultant sealing tape has a soft texture.

The textile product of the present invention is a textile product obtained by sewing or fusing the fabric laminated product, wherein at least a part of the sewn part or the fused part is subjected to sealing treatment using the above sealing tape. By using the sealing tape of the present invention, the textile product excellent in sealing effect can be obtained.

A preferable textile product is one having a flexible film, a woven fabric laminated on one side of the flexible film and a cloth laminated on another side of the flexible film, wherein the woven fabric has a total cover factor ($CF_{total}$) of from 700 to 1400, calculated from the cover factors of the warp and the weft constituting the woven fabric, according to the following formulae, that is used as the fabric laminated product, and with the sealing treatment conducted on the woven fabric side of the fabric laminated product.

$$CF_{total} = CF_m + CF_t$$

$$CF_m = \sqrt{F_m} \times D_m$$

$$CF_t = \sqrt{F_t} \times D_t \qquad \text{[Formula 2]}$$

$CF_m$: cover factor of the warp
$CF_t$: cover factor of the weft
$F_m$: fineness (dtex) of the warp
$F_t$: fineness (dtex) of the weft
$D_m$: density of the warp (counts/2.54 cm)
$D_t$: density of the weft (counts/2.54 cm)

Namely, the woven fabric satisfying the value of the above cover factor is, in the same manner as the woven fabric laminated in the sealing tape, excellent in impregnation of the adhesive layer of the sealing tape, and is capable of obtaining an excellent sealing effect at the joint (sewn part and fused part) when the fabric laminated product is processed into a textile product. Additionally, by using a fabric laminated product laminated with the woven fabric, a textile product which is lighter in weight than a fabric laminated product laminated with a conventional tricot knit can be obtained. At least one of the cover factor ($CF_m$) of the warp or the cover factor ($CF_t$) of the weft is preferably in a range from 300 to 800.

As the flexible film of the fabric laminated product, a waterproof, moisture-permeable film is preferred, and a porous polytetrafluoroethylene film is more preferable. By a use of the waterproof, moisture-permeable film as the flexible film, a textile product which is excellent in waterproof property and moisture permeability can be obtained. As the textile product, for example, a garment is preferred.

The present invention can provide a sealing tape which overcomes a practical limitation that the knit must be used on the surface of the sealing tape and, at the same time, which is excellent in durability (waterproof property), light in weight and thin, and highly comfortable without undermining appearance and touch feeling. If the sealing tape of the present invention is used for textile products, the textile products are excellent in durability (waterproof property), appearance and touch feeling, and can be reduced in weight and compactible.

Figure 1:
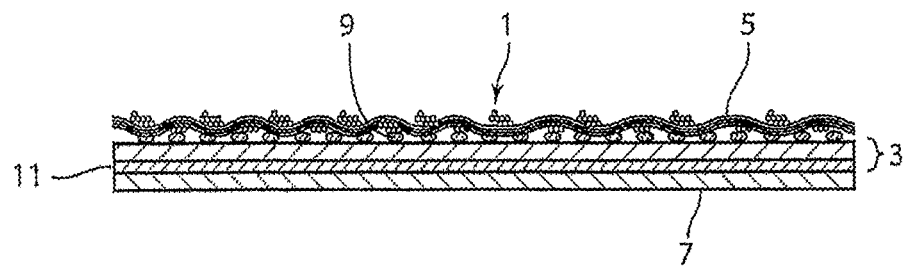
FIG. 1 is an illustration diagram exemplifying the cross section structure of the sealing tape of the present invention.

DESCRIPTION OF THE PREFERRED EMBODIMENT (1) Sealing Tape

The sealing tape of the present invention is a sealing tape comprising a base film, a woven fabric laminated on one side of the base film and an adhesive layer laminated on another side of the base film, wherein the woven fabric has a total cover factor ($CF_{total}$) of from 500 to 1400, calculated from the cover factors of a warp and a weft constituting the woven fabric according to the following formulae.

$$CF_{total} = CF_m + CF_t$$

$$CF_m = \sqrt{F_m} \times D_m$$

$$CF_t = \sqrt{F_t} \times D_t \quad \text{[Formula 3]}$$

$CF_m$: cover factor of the warp
$CF_t$: cover factor of the weft
$F_m$: fineness (dtex) of the warp
$F_t$: fineness (dtex) of the weft
$D_m$: density of the warp (counts/2.54 cm)
$D_t$: density of the weft (counts/2.54 cm)

(1-1) Regarding the Woven Fabric

First, the woven fabric laminated on the base film used in the present invention will be explained. The woven fabric used in the present invention has a total value ($CF_{total}$) of the cover factors of the warp and the weft constituting the woven fabric, respectively calculated according to the above formulae, and which total value ($CF_{total}$) is 500 or more, more preferably 700 or more, even more preferably 900 or more, and preferably 1400 or less, more preferably 1300 or less, even more preferably 1200 or less. Herein, the cover factor represents coarseness of a mesh of the woven fabric; the larger the number is, the smaller the space between fibers becomes, and the smaller the number is, the larger the space between the fibers becomes.

In the present invention, the total cover factor ($CF_{total}$) of the cover factors of the warp and the weft constituting the woven fabric respectively calculated by the above formulae is 500 or more, because the strength of the woven fabric to be used is ensured to improve handling and workability, at the same time, the appearance and touch feeling of minimum requirement is maintained. On the other hand, in order to ensure impregnation at the crossing point, the woven fabric used in the present invention needs to have a mesh with a certain degree of coarseness. Therefore, the total cover factor calculated by the above formulae is preferably 1400 or less.

At least one of the cover factor of the warp ($CF_m$) and the cover factor of the weft ($CF_t$) is preferably 200 or more, more preferably 300 or more, and preferably 800 or less, more preferably 700 or less. By making at least one of the cover factor of the warp and the cover factor of the weft in the above range, impregnation at the crossing point is improved while ensuring the strength of the woven fabric to be used and the handling in laminating the woven fabric. The cover factors of the warp and the weft can be controlled by suitably selecting the fineness and density thereof as clearly seen from the above formulae.

A fineness of the warp and the weft constituting the woven fabric is preferably 5 dtex or more, more preferably 7 dtex or more and preferably 55 dtex or less, more preferably 33 dtex or less. Making the fineness 5 dtex or more ensures the physical strength of the woven fabric and the resultant sealing tape and thus the wear-resistance at a practical level is obtained. Additionally, by making the fineness 55 dtex or less, the thickness of the woven fabric becomes thin and the capacity of the void part existing between yarn can be reduced, so that impregnation of the crossing point is improved. Additionally, the woven fabric and the resultant sealing tape become light-weighted and, at the same time, the textures thereof become soft.

At least one of the warp and the weft constituting the woven fabric is preferably composed of two or more filaments. By using the warp or the weft composed of two or more filaments, the textures of the woven fabric and the resultant sealing tape become soft. Further, the filament constituting the warp or the weft preferably has a fineness per filament of 12 dtex or less. If the fineness per filament of the filament constituting the warp or the weft is 12 dtex or less, the thickness of the woven fabric becomes thin and the capacity of the void part present between yarn can be reduced, thereby improving impregnation of the crossing point. Additionally, the textures of the woven fabric and the resultant sealing tape become even softer.

The density of the warp and the weft constituting the woven fabric may be suitably decided so as to satisfy the range of the total cover factor.

The material of the fiber constituting the woven fabric used in the present invention (the fiber constituting the warp or the weft) is not particularly limited, but in a case of using the below-mentioned hot melt adhesive for the adhesive layer of the sealing tape, it preferably has a heat resistance higher than the softening point of the hot melt adhesive. Normally, since the softening point of the hot melt adhesive is less than about 140° C., a fiber having a softening point of 140° C. or more and a heat resistance which does not cause considerable deformation at a temperature less than 140° C. is preferably used, and a fiber having a softening point of 170° C. or more and a heat resistance which does not cause considerable deformation at a temperature less than 170° C. is more preferably used.

The fiber may be either a natural fiber or a synthetic fiber. Examples of the natural fiber include plant fibers such as cotton and linen and animal fibers such as silk, wool and the like, and examples of the synthetic fiber include a polyamide fiber, a polyester fiber and an acrylic fiber. In particular, when it is used for a garment, the polyamide fiber, the polyester fiber and the like are preferred in view of flexibility, strength, heat resistance, durability, cost, lightness in weight and the like.

The fiber constituting the woven fabric used in the present invention may be either a long-fiber or a short-fiber, but it is preferably a long-fiber or a fiber which is substantially close to a long-fiber. It is because, when the short-fiber is used, the surface of the woven fabric of the resultant sealing tape is likely to be frayed, and the impregnation at the crossing point is lowered so that the sealing effect tends to be lowered. Accordingly, in a case of using the short-fiber, it is preferred that the fray of the surface of the woven fabric of the resultant sealing tape is preferably treated (removed) by burning or melt treatment.

The yarn type of the fiber is not particularly limited, but in scouring, dyeing after production of a grey fabric, subsequent lamination process and in handling, if the warp and the weft constituting the low density woven fabric is a raw silk, poor appearance due to slipping of the yarn becomes more likely to occur, or the production becomes difficult. Therefore, the type of yarn is preferably a textured yarn, more preferably a false twist textured yarn. By using the textured yarn, impregnation at the crossing point is further improved in comparison with the raw silk. It is because, when the textured yarn is used, the spaces between the filaments constituting a yarn are enlarged so that it becomes easier for the adhesive of the sealing tape to impregnate between the filaments.

The weave of the woven fabric is not particularly limited, and includes a twill weave, a sateen weave, and a plain weave. Among them, the plain weave construction is preferred. If the woven fabric has the plain weave construction, the balance of properties between the warp direction and the weft direction becomes excellent and, in terms of structure, it is excellent in strength and wear-resistance so that the fiber density is easily made low, thereby improving impregnation at the crossing point.

(1-2) Regarding the Base Film

Next, the base film used in the present invention will be explained. The material for the base film is not particularly limited, but in a case that a below-mentioned hot melt adhesive is used for the adhesive layer of the sealing tape, it preferably has a heat resistance higher than the softening point of the hot melt adhesive. Normally, since the softening point of the hot melt adhesive is less than about 140° C., it is preferred to use a base film having a softening point of 140° C. or more and a heat resistance which does not cause a considerable deformation at a temperature of less than 140° C.; and it is more preferable to use a base film having a softening point of 170° C. or more and a heat resistance which does not cause a considerable deformation at a temperature of less than 170° C.

Examples of the base film include a film of a polyurethane resin, a polyester resin such as polyethylene terephthalate and polybutylene terephthalate, an acrylic resin, a polyamide resin, a vinyl chloride resin, a synthetic rubber, a natural rubber, a silicone resin, and a fluorine-containing resin. Additionally, the base film may further contain a modifier such as a pigment, an ultraviolet absorber and a filler.

Suitably, a thickness of the base film is 5 μm or more, more preferably 10 μm or more, and preferably 300 μm or less, more preferably 100 μm or less. By making the thickness of the base film 5 μm or more, handling at the time of production is improved, and by making the thickness 300 μm or less, the flexibility of the base film can be ensured. The thickness of the base film is an average thickness measured using a dial thickness gauge (measured in a condition where no load except the spring load of the main body is applied using 1/1000 mm dial thickness gauge manufactured by TECLOCK).

As the base film, for example, one having a waterproof property is preferably used. If the base film having a waterproof property is used, a waterproof property can be imparted on a sealed portion treated with the sealing tape. In a usage where, in particular, the sealed portion is also required to have a waterproof property, it is preferred to use the base film having a waterproof property of 100 cm or more, more preferably 200 cm or more in terms of water resistance (waterproof property) measured in accordance with JIS L 1092 A method.

Examples of the film having the waterproof property include a non-porous polymer film or a porous film comprising a hydrophobic resin such as a fluorine-containing resin, a polyurethane resin subjected to water-repellent treatment (hereinafter, simply referred to as "hydrophobic porous film" in some cases). Here, "hydrophobic resin" means a resin wherein, when a smooth and flat plate is molded using the resin, a contact angle of a water droplet put on a surface of the plate is 60 degree or more (measurement temperature: 25° C.), more preferably, 80 degree or more.

The hydrophobic porous film exhibits waterproof property as an entire film, since the hydrophobic resin constituting the film base material suppresses the entering of water into the pore. On the other hand, since it is a porous body, the adhesive permeates into the pores of the film to develop an anchor effect, so that a lamination process excellent in durability is possible. Among them, as the film having the waterproof property, the porous film comprising the fluorine-containing resin is preferred in view of heat resistance and dimensional stability and porous polytetrafluoroethylene film (hereinafter referred to as "porous PTFE film" in some cases) is more preferable. In particular, since in the porous PTFE film, polytetrafluoroethylene which is a resin component constituting a film base material has a high hydrophobic property (water-repellent property), an excellent waterproof property can be obtained and, at the same time, a film having high porosity can be obtained, so that excellent adhesion durability can be achieved due to an anchor effect of the adhesive.

The porous PTFE film is obtained by mixing a fine powder of polytetrafluoroethylene (PTFE) with a molding auxiliary agent to give a molded body of a paste, removing the molding auxiliary agent from the molded body, and then expanding a product into a plane at a high temperature and high speed, and thus has a porous structure. In other words, the porous PTFE film is constructed with nodes interconnected by fine crystal ribbons, which arean aggregate of primary particles of polytetrafluoroethylene, and fibrils, which are bundles of crystal ribbons fully expanded from the primary particles. A space defined by fibrils and nodes connecting the fibrils is a pore in the film. Porosity, a maximum pore diameter, and the like of the porous PTFE film described below can be controlled by controlling an expanding ratio and the like.

A maximum pore size of the hydrophobic porous film is preferably 0.01 µm or more, more preferably 0.1 µm or more, and preferably 10 µm or less, more preferably 1 µm or less. If the maximum pore size is less than 0.01 µm, production of the film becomes difficult, while if it is more than 10 µm, the waterproof property of the hydrophobic porous film is lowered and film strength becomes weak, so that it tends to be difficult to handle the film during post-processes such as lamination.

Porosity of the hydrophobic porous film is preferably 50% or more, more preferably 60% or more and is preferably 98% or less, more preferably 95% or less. By making the porosity of the hydrophobic porous film 50% or more, an anchor effect of the adhesive will be enhanced. On the other hand, by making the porosity 98% or less, strength of the film can be ensured.

The maximum pore size is the value measured in accordance with the regulations of ASTM F-316. The porosity is obtained by calculation by the following formula from the apparent density (ρ) measured in accordance with the measurement of apparent density of JIS K 6885.

$$\text{Porosity}(\%)=(2.2-\rho)/2.2\times100$$

An appropriate thickness of the hydrophobic porous film is preferably 5 µm or more, more preferably 10 µm or more, and preferably 300 µm or less, more preferably 100 µm or less. By making the thickness of the hydrophobic porous film 5 µm or more, handling during production is improved, and by making the thickness 300 µm or less, flexibility of the hydrophobic porous film is ensured. The measurement of the thickness of the hydrophobic porous film was by average thickness measured using a dial thickness gauge (measured under a condition where no load except the spring load of the main body is applied using a 1/1000 mm dial thickness gauge manufactured by TECLOCK).

In the present invention, the hydrophobic porous film preferably has a hydrophilic resin layer on the side where the adhesive layer is laminated. By forming the hydrophilic resin layer, the mechanical strength of the hydrophobic porous film is improved and, at the same time, the adhesion with the adhesive layer is improved, thereby obtaining a sealing tape which is excellent in durability. The hydrophilic resin layer may be formed on a surface of the hydrophobic porous film, but a part of the hydrophilic resin layer may be impregnated on a surface part of the hydrophobic porous film. By the impregnation of a part of the hydrophilic resin layer in the pores of the surface of the hydrophobic porous film, an anchor effect is obtained, thereby strengthening the bonding strength of the hydrophilic resin layer and the hydrophobic porous film.

As the hydrophilic resin, the polymeric material having a hydrophilic group such as a hydroxyl group, a carboxyl group, a sulfonate group, and an amino acid group which material is water-swelling and water-insoluble is preferably used. Specifically, the examples may include a hydrophilic polymer, at least a part of which is crosslinked, such as polyvinyl alcohol, acetic acid cellulose, and cellulose nitrate and a hydrophilic polyurethane resin, but in view of heat resistance, chemical resistance, workability and the like, the hydrophilic polyurethane resin is particularly preferred.

As the hydrophilic polyurethane resin, a polyester-base or polyether-based polyurethane or prepolymer containing a hydrophilic group such as a hydroxyl group, an amino group, a carboxyl group, a sulfone group, and an oxyethylene group is used. In order to adjust the melting point (softening point) of the resin, diisocyanate, triisocyanate, or the adduct thereof having two or more isocyanate groups may used alone or as a mixture as a crosslinker. In a case of an isocyanate-terminated prepolymer, a polyol having two or more functional groups such as a diol or a derivative thereof and a triol or a derivative thereof, or a polyamine having two or more functional groups such as a diamine or a derivative thereof and a triamine or a derivative thereof may be used as a curing agent.

As a method of forming a hydrophilic resin layer such as a hydrophilic polyurethane resin on the surface of the hydrophobic porous film, an application liquid is prepared by a method such as making a solution from a (poly) urethane resin using a solvent, heating the resin into a melt and the like, and the application liquid is applied onto a hydrophobic porous film with a roll coater and the like. The viscosity of the application liquid suitable for impregnating the hydrophilic resin to the surface portion of the hydrophobic porous film is 20,000 mPa·s or less, more preferably 10,000 mPa·s or less under a temperature of application. In the case of making a solution using a solvent, although it depends on the composition of the solvent, when the viscosity of the solution becomes too low, the solution is dispersed over the whole hydrophobic porous film after the application; thus, there is a possibility that the whole hydrophobic porous film is made hydrophilic and a uniform resin layer is not formed on a surface of the hydrophobic porous film, which increases the possibility of causing a problem of waterproof property, so that it is desirable to maintain a viscosity of 500 mPa·s or more. The viscosity can be measured using a B-type viscometer manufactured by TOKI SANGYO CO., LTD.

(1-3) Regarding the Adhesive Layer

Next, the adhesive layer laminated in the sealing tape of the present invention will be explained. The adhesive used for the adhesive layer is not particularly limited as long as it exhibits a sealing effect by filling voids formed on the joint such as a stitch and a seam of the textile product during sealing treatment, but a hot melt adhesive which is heat-melted by means of hot-air, ultrasound, high frequency wave and the like to exhibit adhesive strength is preferred, since the handling of the hot melt adhesive is good during sealing process. As the hot melt adhesive, various resins such as a polyethylene resin or a copolymer resin thereof, a polyamide resin, a polyester resin, a butyral resin, a polyacetic acid vinyl resin or a copolymer resin thereof, a cellulose derivative resin, a polymethyl methacrylate resin, a polyvinyl ether resin, a polyurethane resin, a polycarbonate resin, and a polyvinylchloride resin can be used alone or as a mixture of two or more kinds as necessary.

In a case of using the sealing tape of the present invention for a garment, a soft texture is required in addition to dry cleaning durability and washing durability. In such a case, as the hot melt adhesive, a polyurethane resin is preferred.

The flow rate of the hot melt adhesive (measured at 180° C. using flow tester "CFT-500" manufactured by Shimadzu Corporation) is $40\times10^{-3}$ cm$^3$/s or more, more preferably $60\times10^{-3}$ cm$^3$/s or more, and preferably $200\times10^{-3}$ cm$^3$/s or less, more preferably $100\times10^{-3}$ cm$^3$/s or less. If a flow value of the hot melt adhesive is too low, the adhesive strength becomes insufficient, while if it is too high, the hot melt adhesive which has been melted is eluted from pinholes of the sewn part or spilt from the edges of the tape during sealing process, resulting in lowering of appearance or a failure to obtain sufficient waterproof property.

The thickness of the hot melt adhesive layer is preferably 20 μm or more, more preferably 50 μm or more, and preferably 400 μm or less, more preferably 200 μm or less, particularly preferably 120 μm or less. If the hot melt adhesive layer is less than 20 μm, an amount of the resin is too small so that it is difficult to completely seal the concavity and convexity of the yarn at the pinhole part, so that a waterproof property of a sewn region may become insufficient. Additionally, it is difficult to stably coat a hot melt adhesive layer of less than 20 μm, so that there is an increased possibility to cause a coating defect called fish eye on the hot melt adhesive layer. On the other hand, when the hot melt adhesive layer has a thickness of more than 400 μm, it takes long to sufficiently melt the hot melt adhesive when heat-pressing the sealing tape, so that there are possibilities of lowering productivity and causing a thermal damage on the base film to be bonded. If the time for heat-pressing is shortened, the hot melt adhesive layer is not melted sufficiently so that a sufficient sealing effect cannot be obtained. Additionally, the texture of the sealed portion after bonding process becomes hard; for example, if the sealing tape of the present invention is applied to a garment, it causes a rough texture of the sealed portion.

It is also a preferred embodiment to suitably change the thickness of the hot melt adhesive layer in accordance with the type of cloth of the fabric laminated product to be subjected to the sealing treatment. For example, if the cloth on the side to be subjected to sealing treatment of the fabric laminated product is a woven fabric satisfying the cover factor to be described later, thickness of the hot melt adhesive layer of sealing tape can be made thin, and for example, it is preferably 120 μm or less. If the thickness of the hot melt adhesive layer is 120 μm or less, a textile product which is excellent in texture and appearance of the sewn portion can be obtained. Further, since an amount of the resin of the hot melt adhesive may be small, a cost of the material can be reduced due to a reduction in an amount of resin. Also, since an adhesive melts in a short time when pressing the sealing tape, productivity can be improved due to speeding-up of pressing process. Due to the synergic effect thereof, the production cost of the textile product can be reduced. On the other hand, if the cloth on the side to be subjected to sealing treatment of the fabric laminated product is a tricot knit, a sufficient amount of the hot melt adhesive for filling the spaces inside the tricot knit becomes necessary, so that the thickness of the hot melt adhesive layer is preferably 150 μm or more.

The sealing tape of the present invention preferably has a 10% modulus of 10 N/cm or more, more preferably 12 N/cm or more, and preferably has a 10% modulus of 50 N/cm or less, more preferably 30 N/cm or less, along a length direction thereof. By making the 10% modulus along the length direction in the above range, a width change of the tape before and after the sealing process is suppressed, so that more stable sealing process can be performed. If the 10% modulus is less than 10 N/cm, when carrying out the sealing process, the tape becomes in a state of necking (state wherein the tape is stretched along the length direction and becomes narrow in width), so that there is a possibility that a sufficient sealing table cannot be obtained in a place where it is difficult to carry out a sealing process such as a curved region. Also, if the 10% modulus becomes more than 50 N/cm, the texture of the sealing tape becomes hard, so that when it is made into a textile product, the part subjected to sealing process tends to become rough.

(2) Production of Sealing Tape

Next, the method of producing the sealing tape of the present invention will be explained.

The method of producing the sealing tape of the present invention includes a first step of laminating the base film and the above-described woven fabric to obtain a first laminated product, a second step of coating an adhesive on the side of a base film of the first laminated product in the first step to obtain a second laminated product, and a step of slit processing the second laminated product obtained in the second step into a tape form. Hereinafter, details of each step will be explained.

(2-1) First Step

In the first step, the base film and the above-described woven fabric are laminated, thereby obtaining the first laminated product. For the lamination of the base film and the above-described woven fabric, a method such as adhesion and fusion are suitably used. In a case where a material which is difficult to be subjected to fusion process such as a polyamide fiber and a polyester fiber is used as the material of the woven fabric, the base film and the above-described woven fabric are preferably bonded using an adhesive.

As the adhesive, a curable resin adhesive which can be cured by a chemical reaction, a reaction with heat, light and moisture and the like is preferred. Such examples include various resin adhesives of a polyester resin, a polyamide resin, a polyurethane resin, a silicone resin, a (meth)acrylic resin, a polyvinylchloride resin, a polyolefin resin, a polybutadiene rubber, other rubbers and the like. Among these, preferred is the polyurethane resin adhesive. As the polyurethane resin adhesive, a curing reaction-type hot melt adhesive is particularly preferred.

The curing reaction-type hot melt adhesive is in a solid state under a normal temperature, and is melted by heating to be a liquid of low viscosity; it is an adhesive which becomes a liquid of high viscosity or a solid by a curing reaction caused by maintaining a heating condition, raising the temperature further, or contacting a polyfunctional compound having moisture or other active hydrogens and the like. The curing reaction can be promoted by the presence of a curing catalyst, a curing agent and the like.

As the curing reaction-type polyurethane resin hot melt adhesive used for adhesion between the base film and the woven fabric, for example, one having a viscosity from 500 mPa·s to 30,000 mPa·s (more preferably 3,000 mPa·s or less) when it is melted by heating to become a liquid having low viscosity (namely, when being coated for adhesion) is preferred. Viscosity here is a value measured using "ICI™ cone & plate viscometer" manufactured by RESEARCH EQUIPMENT wherein the roller is set as corn type, and at a temperature of 125° C. As the curing reaction-type polyurethane resin hot melt adhesive, one capable of curing reaction by humidity (moisture) is preferred.

The curing reaction-type polyurethane resin hot melt adhesive can be obtained by an addition reaction of a polyester polyol, polyether polyol and the like with an aliphatic or an aromatic polyisocyanate such as TDI (tolylene diisocyanate), MDI (diphenylmethane diisocyanate), XDI (xylylene diisocyanate), and IPDI (isophorone diisocyanate) such that an isocyanate group remains at terminals. The resultant curing reaction-type polyurethane resin hot melt adhesive has an isocyanate group at the terminal thereof and thus causes a curing reaction by humidity in the air. A melting temperature of the curing reaction-type polyurethane resin hot melt adhesive is 50° C. or more, more preferably 80° C. or more and preferably 150° C. or less, which are somewhat higher than a room temperature.

Examples of the curing reaction-type polyurethane resin hot melt adhesive include "BONDMASTER™" commercially available from Nippon NSC Ltd. By heating to 70 to 150° C., the curing reaction-type polyurethane resin hot melt adhesive becomes a melt having a coatable viscosity. The melt is coated on the base film to bond the base film with the woven fabric, followed by cooling to about a room temperature, thereby becoming the semisolid to suppress an excessive penetration and diffusion to the woven fabric. Then the curing reaction progresses due to the humidity in the air, thereby obtaining a soft and strong adhesion.

The method of coating the adhesive which bonds the base film and the woven fabric is not particularly limited, and such methods as rolling, spraying and brush coating may be employed. In order to enhance flexibility of the laminated product, it is recommended that the adhesive is coated in the form of the thin film, or coated partially like dot-form or line-form.

In the case of coating the adhesive in the form of thin film, it is recommended that the adhesive layer have the thickness of preferably 5 μm or more, more preferably 10 μm or more and preferably 100 μm or less, more preferably 70 μm or less. If the thickness of the adhesive layer is less than 5 μm, a sufficient adhesion may not be obtained, while if it is more than 100 μm, the texture of the resultant sealing tape becomes hard. An area of adhesion (an area where the adhesive is coated) in a case where the adhesive is partially coated is preferably 5% or more, more preferably 40% or more and preferably 95% or less, more preferably 90% or less relative to a total area of the surface of the base film. If the area of adhesion is less than 5%, sufficient adhesion may not be obtained. If the area of adhesion is more than 95%, an effect of increasing flexibility cannot be obtained sufficiently.

An amount of the adhesive to be coated can be set in consideration of concavity and convexity, fiber density, required adhesion, durability and the like of the woven fabric. The amount of coating is preferably 1 g/m$^2$ or more, more preferably 4 g/m$^2$ or more, and preferably 50 g/m$^2$ or less, more preferably 30 g/m$^2$ or less. If the amount of the adhesive to be coated is too small, adhesion becomes insufficient, and for example, durability enough to endure washing cannot be obtained in some cases. On the other hand, if the amount of the adhesive is too large, the texture of the resultant laminated product may become too hard in some cases, and thus unpreferable.

A preferred method of lamination includes, for example, a method of coating a base film using a roll having a gravure pattern wherein a melt of the curing reaction-type polyurethane resin adhesive is coated and placing the above-described woven fabric thereon to pressure-bond them using a roll. By this method, a good adhesive strength can be ensured and, at the same time, the texture of the resultant laminated product is good and the yield becomes good, too.

(2-2) Second Step

In the second step, the adhesive is coated on the side of the base film of the first laminated product obtained in the first step, thereby obtaining the second laminated product. Herein, a case of using a hot melt adhesive as the adhesive is explained. A form of the hot melt adhesive may be in massive form, pellet form, powder form, bead form, flake form and the like, and may be suitably used. The method of coating the hot melt adhesive on the first laminated product obtained in the first step include, for example, a solvent method, a heat fusion method, an extrusion method and the like, and from the point of quality and costs, the extrusion method is preferably used. In the extrusion method, a hot melt adhesive is heat melted in an extruder to be pressure fed to a die, and the hot melt adhesive is let out from the die on the base film of the first laminated product to coat it followed by cooling on a cooling roll, thereby obtaining the second laminated product.

(2-3) Third Step

The second laminated product obtained in the second step is subjected to slit processing into an appropriate width in order to be used as a sealing tape. The slit processing may be performed by a publicly known method, and a slit processing using male and female blades (slit blade) and the like may be suitably used. The slit width may be suitably chosen in accordance with the slit width necessary for the tape, and is preferably 5 mm or more, more preferably 8 mm or more, and preferably 50 mm or less, more preferably 25 mm or less. If the width is narrower than 5 mm, sealing table when covering the sealed portion with the tape becomes too small, so that the sealing effect may be undermined. On the other hand, if the width is 50 mm or more, wrinkle and puckering are more likely to be formed, so that the appearance of the product becomes poor.

The second laminated product, since it is laminated with a woven fabric in the first step, can be subjected to slit processing by applying a higher tension compared with a case where a knit is laminated. Herein, the tension means the tension applied on the length direction of the slit when winding the processed sealing tape.

In the present invention, the tension for winding the sealing tape during slit processing is not particularly limited, and it is preferably 70 N/m or more and 100 N/m or less. By making the tension 70 N/m or more, in a case of slit processing using the slit blade, the second laminated product is readily cut, thereby improving productivity. By making the tension 100 N/m or less, elongation of the second laminated product in length direction is suppressed, thereby preventing necking.

In the production process of the sealing tape using a knit as a backing material, if the tension during the slit processing is 70 N/m or more, it causes necking so that the width becomes narrow; if the tension is removed after the slit processing, a width of the sealing tape becomes wider than the width of the slit blade, resulting in an irregularity of a slit width. In case of a higher tension of 100 N/m or more, since the sealing tape is wound while being stretched along the length direction, there is a possibility that a roll rewound after the slit processing is deformed into a bowl-shape. Contrarily, in a case of a tension of 40 N/m or less, an edge of the slit blade becomes poor, and additionally, a processing trouble that the slit tape is wound on the slit blade becomes likely to occur. In this manner, since the sealing tape using a tricot knit as a backing material has a property that it tends to be stretched in the length direction, a range of setting condition of the tension in slit processing is narrow, and an upper limit of the slit processing speed is to be 15 m/min, and a setting a higher speed is difficult.

(3) Textile Product of the Present Invention

The present invention includes a textile product obtained by sewing-processing of the fabric laminated product, wherein at least a part of the sewn part is subjected to sealing treatment using the sealing tape of the present invention, and a textile product obtained by subjecting a fabric laminated product to fusion process, wherein at least a part of the fused part is subjected to sealing treatment using the sealing tape of the present invention. By processing the fabric laminated product into a textile product using the sealing tape of the present invention, a textile product which is excellent in sealing effect can be obtained. At least a part of the sewn part or the fused part may be subjected to sealing treatment using the sealing tape of the present invention, and the whole sewn part or the fused part may be subjected to sealing treatment using the sealing tape of the present invention.

The fabric laminated product of the textile product of the present invention is not particularly limited, and includes, for example, a fabric laminated product wherein a cloth is laminated on a flexible film.

The textile product of the present invention preferably uses a fabric laminated product which has a flexible film, a woven fabric laminated on one side of the flexible film and a cloth laminated on another side of the flexible film, wherein the woven fabric has a total cover factor ($CF_{total}$) of from 700 to 1400, calculated from the cover factors of the warp and the weft constituting the woven fabric according to the following formulae, and wherein the woven fabric side of the fabric laminated product is preferably subjected to the sealing treatment using the sealing tape of the present invention. Namely, if the woven fabric satisfying the range of the aforementioned cover factor is used as the woven fabric laminated on the side to be subjected to sealing treatment of the fabric laminated product, excellent impregnation of the adhesive of the sealing tape and an excellent sealing effect can be obtained at the joint (sewn part and fused part) when the fabric laminated product is processed into a textile product in the same manner as the woven fabric laminated in the sealing tape.

$$CF_{total} = CF_m + CF_t$$

$$CF_m = \sqrt{F_m} \times D_m$$

$$CF_t = \sqrt{F_t} \times D_t \qquad \text{[Formula 4]}$$

$CF_m$: cover factor of the warp
$CF_t$: cover factor of the weft
$F_m$: fineness (dtex) of the warp
$F_t$: fineness (dtex) of the weft
$D_m$: density of the warp (counts/2.54 cm)
$D_t$: density of the weft (counts/2.54 cm)

(3-1) Regarding the Woven Fabric

The woven fabric laminated in the fabric laminated product preferably used for the textile product of the present invention will be explained. The woven fabric has a total value ($CF_{total}$) of the cover factors of the warp and the weft constituting the woven fabric, respectively calculated according to the above formulae, and which total value ($CF_{total}$) is 700 or more, more preferably 800 or more, even more preferably 900 or more, and preferably 1400 or less, more preferably 1300 or less, even more preferably 1200 or less. The total value ($CF_{total}$) of the cover factors of the warp and the weft constituting the woven fabric, respectively calculated according to the above formulae is made to be 700 or more in order to ensure the strength of the woven fabric to be used so as to improve handling and workability as well as maintain the minimum appearance and touch feeling. When the total cover factor is less than 700, physical strength (abrasion resistance and the like) of the resultant fabric laminated product becomes insufficient for practical use, and appearance and touch feeling becomes poor. The appearance of the resultant fabric laminated product depends on the appearance of the surface which is exposed outside, and when the total cover factor is less than 700, the flexible film seen through the spaces between the yarns of the woven fabric become more visible, so that it cannot satisfy the quality generally required from a textile product. Touch feeling of the resultant fabric laminated product is a sense felt when human body touches a fabric laminated product (sense in the skin), but when the total cover factor becomes less than 700, the sense in the skin becomes rough. On the other hand, in order to ensure impregnation of the adhesive of the sealing tape into the woven fabric, the woven fabric used for the fabric laminated product needs to have a mesh which is rough to some extent. Therefore, the total cover factor of the warp and the weft constituting the woven fabric is preferably 1400 or less. If the total cover factor becomes more than 1400, impregnation of the adhesive of the sealing tape into the spaces between the yarns forming the woven fabric becomes insufficient, so that the sealing property of the sealed portion cannot be ensured and texture of the resultant fabric laminated product becomes hard, resulting in difficulty in reduction in weight.

At least one of the cover factor of the warp ($CF_m$) or the cover factor of the weft of the woven fabric ($CF_t$) is preferably 300 or more, more preferably 400 or more, and preferably 800 or less, more preferably 700 or less. By making at least one of the cover factor of the warp or the cover factor of the weft of the woven fabric in the above range, strength and handling of the woven fabric, impregnation of the adhesive of the sealing tape to the woven fabric and the like are improved. The cover factor of the warp and the cover factor of the weft can be controlled by suitably selecting the fineness and the density as clearly seen by the above formulae.

A preferred embodiment of the woven fabric to be used for the fabric laminated product and the fiber constituting the woven fabric is the same as the preferred embodiment of the woven fabric to be used for the sealing tape and the fiber constituting the woven fabric, except the range of the cover factor.

(3-2) Regarding Flexible Film

Next, the flexible film used for the fabric laminated product is described.

The flexible film is not specifically limited as long as it has flexibility. Examples of the flexible film include films of a polyurethane resin, a polyester resin such as polyethylene terephthalate and polybutylene terephthalate, an acrylic resin, a polyolefin resin such as polyethylene and polyolefin, a polyamide resin, a vinyl chloride resin, a synthetic rubber, a natural rubber, and a fluorine-containing resin.

A thickness of the flexible film is preferably 5 μm or more, more preferably 10 μm or more, and is 300 μm or less, more preferably 100 μm or less. If the thickness of the flexible film is thinner than 5 μm, the flexible film has difficulty in handling in production, while if the thickness is over 300 μm, flexibility of the flexible film is impaired. The flexible film is measured with a dial-type thickness gauge (measured with a 1/1000 mm dial-type thickness gauge manufactured by TECLOCK and without applying a load except a spring body), and an average of the measurement is considered as the thickness of the flexile film.

The flexible film used is preferably a film having, for example, a waterproof, wind-proof, or dust-proof property. When a waterproof film is used as the flexible film, the resultant fabric laminated product can have a waterproof property. When a waterproof and moisture-permeable film is used, the resultant fabric laminated product can have a waterproof and moisture-permeable property. Generally, a film having a waterproof or waterproof and moisture-permeable property also has wind-proof and dust-proof properties. In applications requiring particularly a waterproof property such as rainwear garments, a flexible film having a water-resistance (waterproof property) of 100 cm or more, more preferably 200 cm or more measured in accordance with JIS L 1092 A is preferably used.

In a preferred embodiment of the present invention, a waterproof and moisture-permeable film is used as the flexible film. The waterproof and moisture-permeable film means a film having both a "waterproof property" and a "moisture-permeable property". That is, the resultant fabric laminated product can have the "moisture-permeable property" as well as the "waterproof property". For example, when the fabric laminated product of the present invention is processed into a garment, the vapor of sweat from the body of a person wearing the garment is released to the outside through the fabric laminated product, and thus the person can be kept away from a humid feeling during wearing. As used herein, a "moisture-permeable property" is a property of allowing water vapor to permeate. The flexible film preferably has a moisture-permeable property of, for example, 50 g/m²·h or more, more preferably 100 g/m²·h or more measured in accordance with JIS L 1099 B-2.

Examples of the waterproof and moisture-permeable film include films of hydrophilic resins such as of a polyurethane resin, a polyester resin, a silicone resin and a polyvinyl alcohol resin, and a porous film made of a hydrophobic resin (hereinafter, also referred simply to as a "hydrophobic porous film") such as polyester resin, a polyolefin resin (e.g., polyethylene, polypropylene), a fluorine-containing resin, and a polyurethane resin modified by a water repellent treatment. As used herein, the "hydrophobic resin" means a resin having a contact angle of a water drop of 60 degrees or more (measured at 25° C.), more preferably 80 degrees or more when the resin is formed into a smooth flat plane and a water drop is put thereon.

In the hydrophobic porous film, a porous structure having pores (continuous pores) inside keeps the moisture-permeable property, and the hydrophobic resin constituting the film base material prevents water from entering into the pores to exhibit the waterproof property in the film entirety. Among porous films, preferred for the waterproof and moisture-permeable film is a porous film made of a fluorine-constituting resin, and more preferred is a porous polytetrafluoroethylene film (hereinafter, also referred to as a "porous PTFE film"). Since polytetrafluoroethylene that is a resin component constituting a film base material has high hydrophobicity (water repellent), particularly the porous PTFE films can have both excellent waterproof and moisture-permeable properties.

As the porous PTFE film, the same film used in the sealing tape can be used.

The hydrophobic porous film preferably has pores of which inside surfaces are coated with a water repellent and an oil repellant polymers for use. By coating the inside surfaces of the pores of the hydrophobic porous film with a water repellent and an oil repellant polymers, various contamination such as a skin oil, a machine oil, beverages, and laundry detergents are prevented from penetrating into or being held in the pores of the hydrophobic porous film. Those contaminations cause a decline of hydrophobicity of PTFE preferably used in the hydrophobic porous film to result in an impaired waterproof property.

In this case, as the polymer, a polymer having a fluorine-containing side chain can be used. Details of the polymer and a method for combining it into the porous film are disclosed in, for example, WO 94/22928.

An example of the coating polymer is shown below.

As the coating polymer, preferably used is a polymer having a fluorine-containing side chain (a fluorinated alkyl moiety preferably has 4 to 16 carbon atoms) obtained by polymerization of fluoroalkyl acrylate and/or fluoroalkyl methacrylate represented by the following chemical formula (1)

[Chemical formula 1]

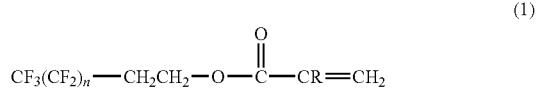

(1)

wherein n is an integer from 3 to 13, R is hydrogen or a methyl group.

A method of coating the inside of the pores of the porous film with the above polymer comprises preparing an aqueous micro emulsion of the polymer (average particle diameter: 0.01 to 0.5 μm) with a fluorine-containing surfactant (e.g., ammonium perfluorooctanate), impregnating the pores of the porous film with the micro emulsion, and heating. By heating, water and the fluorine-containing surfactant are removed off, and the polymer having a fluorine-containing side chain is melted to coat the inside surface of the pores of the porous film while maintaining open cells as they are, and thus the hydrophobic porous film excellent in water and oil repellent properties can be obtained.

Other polymers can be used for the coating polymer, including "TEFLON® AF polymer" (trade name, DuPont), "CYTOP®" (trade name; Asahi Glass Co. Ltd.), and the like. Coating the inside surface of the pores of the porous film with those polymers may be conducted by dissolving the polymers in an inactive solvent such as "FLUORI-NERT®" (trade name; Sumitomo 3M Limited), impregnating the porous PTFE film with the solution, and removing the solvent by evaporation.

In the fabric laminated product of the present invention, the hydrophobic porous film preferably has a hydrophilic resin layer at the side on which the woven fabric is laminated. An embodiment using the hydrophilic resin layer is useful particularly in the case of processing the fabric laminated product used in the present invention into garments for which the woven fabric is used on the back side. That is, the hydrophilic resin absorbs moisture such as sweat generated from the human body and releases it to the outside, and prevents various contaminations such as a skin oil and a cosmetic oil from invading into the pores of the hydrophobic porous film from the body side. In some cases, those contaminations may cause decline of hydrophobicity of PTFE preferably used in the hydrophobic porous film to result in an impaired waterproof property. In addition, the formation of the hydrophilic resin layer also increases mechanical strength of the hydrophobic porous film, and thus the hydrophobic porous film having more excellent durability can be obtained. The hydrophilic resin layer may be formed on the surface of the hydrophobic porous film, but a surface portion of the hydrophobic porous film is preferably impregnated with the hydrophilic resin. The impregnation of the hydrophilic resin into the pores of the hydrophobic porous film surface provides an anchoring effect, which result in higher bonding strength between the hydrophilic resin layer and the hydrophobic porous film. It is noted that the film has a reduced moisture-permeable property if the hydrophobic porous film is impregnated with the hydrophilic resin over the whole thickness direction thereof.

As the hydrophilic resin, preferably used is a polymer material having a hydrophilic group such as a hydroxyl group, a carboxyl group, a sulfonic acid group, and an amino acid group, having water swelling properties, and are water-insoluble. Specific examples include hydrophilic polymers such as polyvinyl alcohol, cellulose acetate, cellulose nitrate, and a hydrophilic polyurethane resin, at least a part of which is crosslinked. In view of the heat-resistance, chemical-resistance, processability, moisture-permeable property and the like, the hydrophilic polyurethane resin is particularly preferred.

As the hydrophilic polyurethane resin, preferably used is a polyester-based or polyether-based polyurethane or a pre-polymer having a hydrophilic group such as a hydroxyl group, an amino group, a carboxyl group, a sulfonic group, and an oxyethylene group. To adjust a melting point (softening point) of the resin, diisocyanates and triisocyanates having two or more isocyanate groups and adducts thereof can be used alone or in combination as a cross-linking agent. For prepolymers having an isocyanate terminal, polyols having bi- or multi-functionality such as diols and triols, and polyamines having bi- or multi-functionality such as diamines and triamines can be used as a curing agent. To keep a moisture-permeable property high, bifunctional is more preferred than trifunctional.

A method of forming the hydrophilic resin layer such as the hydrophilic polyurethane resin on the surface of the hydrophobic porous film comprises preparing a coating liquid by dissolving a hydrophilic resin such as the polyurethane resin in a solvent or by heating the hydrophilic resin to melt, and applying the coating liquid to the hydrophobic porous film with, for example, a roll coater. A viscosity of the coating liquid suitable for impregnating the hydrophilic resin with the surface portion of the hydrophobic porous film is 20,000 mPa·s or less, and more preferably 10,000 mPa·s or less at an applying temperature. In the case of preparing a solution with a solvent, when the viscosity is too low, although depending on a composition of the solvent, the applied solution spreads over the hydrophobic porous film to cause hydrophilization of the whole hydrophobic porous film, and a uniform resin layer may not be formed on the surface of the hydrophobic porous film, which increases probability of defect in waterproof property. Therefore, the viscosity is thus preferably kept 500 mPa·s or more. The viscosity can be measured with a B type viscometer of Toki Sangyo Co. Ltd.

(3-3) Regarding Cloth

In the fabric laminated product preferably used in the present invention, the above-described woven fabric is laminated on one side of the flexible film, on the other of which a cloth is laminated. By laminating the cloth on the other side, physical strength and design of the fabric laminated product to be obtained improves. The cloth is not particularly limited, and the examples may include a woven fabric, a knitted fabric, a net, a nonwoven fabric, a felt, a synthetic leather, a natural leather and the like. Examples of materials constituting the cloth may include natural fibers such as cotton, linen, and animal hair, and a synthetic fiber, a metal fiber, a ceramic fiber and the like, and these can be suitably selected in accordance with the usage of the fabric laminated product. For example, when the fabric laminated product of the present invention is used for an outdoor product, a woven fabric composed of a polyamide fiber, a polyester fiber and the like is preferably used in view of flexibility, strength, durability, cost, lightweight properties and the like. As necessary, the cloth may be subjected to a conventionally known water-repellent treatment, softening treatment, antistatic treatment and the like.

In the fabric laminated product preferably used in the present invention, the above-described woven fabric is laminated on one side of the flexible film and a cloth is further laminated on the other side of the film, and it is not particularly limited as to which is to be a face fabric or a backer fabric of the textile product. Typical embodiments include an embodiment wherein the woven fabric laminated on the side which is subjected to sealing treatment is to be the inner fabric and the cloth laminated on the other side is to be the face fabric. In particular, when the fabric laminated product of the present invention is used for a garment and the like, appearance of the garment to be obtained is improved by making the side subjected to sealing treatment the backer fabric.

(3-4) Production Method of Fabric Laminated Product and Textile Product

The production method of the fabric laminated product and the textile product preferably used in the present invention will be explained.

The production of the fabric laminated product preferably used in the present invention is preferably performed by bonding the flexible film and the woven fabric or the cloth using an adhesive. As the adhesive, the same adhesive that can be used for bonding the base film and the woven fabric in producing the sealing tape can be used. The method for coating the adhesive is not particularly limited, and rolling method, spraying method, brush coating method and the like can be employed. In order to enhance flexibility and moisture permeability of the fabric laminated product to be obtained, it is recommended that application of the adhesive should be in the form of dot or line. A preferred method of lamination includes, for example, a method wherein a solution of the curing reaction-type polyurethane resin adhesive is coated in dot-like form on the flexible film with a roll having a gravure pattern followed by putting the above-described woven fabric or the cloth thereon to subject them to pressure-bonding using a roll. In particular, when the method of coating using the roll having gravure pattern is employed, good adhesive strength can be ensured and texture and moisture permeability of the fabric laminated product to be obtained are excellent, and the yield becomes good, too. When the adhesive is coated in the form of dot or line, an area of adhesion (an area where the adhesive is coated) is preferably 5% or more, more preferably 40% or more and preferably 95% or less, more preferably 90% or less relative to the total area of the flexible film surface. If the area of adhesion is less than 5%, sufficient adhesion may not be obtained. If the area of adhesion is more than 95%, texture of the fabric laminated product to be obtained becomes hard, and moisture permeability becomes insufficient.

The textile product of the present invention can be obtained by using the fabric laminated product in a part or in whole. For example, when the fabric laminated product is used in whole to process it into a textile product, the fabric laminated product is cut into desired shapes and sizes, and these cut materials are processed into textile products by sewing or fusing. When the fabric laminated product of the present invention is used in part to process into a textile product, the fabric laminated product of the present invention and a conventional cloth and the like are used together to process into a textile product in the same manner.

Sewing of the fabric laminated product can be carried out using a sewing machine and the like. Sewing yarns that can be used for the sewing are not particularly limited as long as they are in threadlike form, and for example, yarns of cotton, silk, linen, polynosic, a polyamide resin, a polyester resin, a vinylon resin, a polyurethane resin and the like can be used alone or by mixing. In view of strength, heat resistance and the like, the polyamide resin or the polyester resin is preferably used. Thickness of the sewing yarn can be adjusted suitably in accordance with the thickness of the fabric laminated product to be sewn and the product strength required; for example, in a case of sewing a fabric laminated product of a three-layer structure wherein a stretched porous PTFE film is laminated on one side of the cloth (nylon taffeta of 78 dtex) with an adhesive and a woven fabric (nylon taffeta of 22 dtex; total cover factor of the warp and weft: 700 to 1400) is further laminated with an adhesive using a sewing yarn of polyester resin, a sewing yarn with the yarn number of 40 to 70 is preferably used.

The method of sewing is not particularly limited as long as it is a method of sewing using one or a plurality of yarns, and as a form of stitch, lock stitch, single yarn chain stitch, double chain stitch and the like are used as necessary to sew in a linear, curve, and zigzag form and the like.

The methods of fusing the fabric laminated product include a method wherein fabric laminated products cut into desired shapes and sizes are subjected to thermal compression bond to be fused directly; a method wherein a sheet composed of a hot melt resin (hereinafter simply referred to as "hot melt sheet" in some cases) is used to subject the fabric laminated products to indirect fusing. Examples of the hot melt sheet may include "GORE-SEAM® Sheet Adhesive" manufactured by Japan Gore-Tex Inc. As the hot melt resin of the hot melt sheet, same resin used for the hot melt adhesive layer of the above-described sealing tape can be used, and as the conditions of fusing process of the fabric laminated product using the hot melt sheet, same conditions for pressure-boding the sealing tape to be described later can be adopted.

At least a part of the region of the fabric laminated product which has been sewn or fused (preferably the whole part thereof) is subjected to sealing treatment using the sealing tape of the present invention. It is because, by carrying out the sealing treatment, sealing properties such as a waterproof property, a dust-proof property, and a windproof property and strength of the textile product to be obtained are enhanced. In particular, in a case of processing the fabric laminated product into a textile product by fusing, strength of the fused part of the textile product to be obtained becomes low; thus, by subjecting the fused part to sealing treatment using the sealing tape and the like, strength of the fused part of the textile product to be obtained is improved.

The sealing tape using the hot melt adhesive can be subjected to fusing process using an existing hot air sealer which sprays hot-air on the side of the hot melt adhesive layer of the sealing tape to pressure-bond a hot melt adhesive in a state of being melt to an object to be bonded using a pressure roll. For example, "QHP-805" manufactured by Queen Light Electronic Industries Ltd., "5000E" manufactured by W.L.GORE & ASSOCIATES and the like can be used. In order to subject a short sewn part to fusing process more easily, the sealing tape can be subjected to thermal compression bond using a commercially available thermal press machine or iron. In this case, heat and pressure is applied on the sealing tape which is placed on the sewn part.

The conditions of thermal compression bond of the sealing tape using the hot melt adhesive may be suitably set in accordance with the softening point of the hot melt adhesive, and thickness, quality of the material, fusing speed and the like of the flexible film. Taking an example of thermal compression bond of the sealing tape using the hot melt adhesive, in a fabric laminated product having a three-layer structure formed by laminating a porous PTFE film on one side of the cloth (nylon taffeta of 78 decitex) and further laminating a woven fabric (nylon taffeta of 22 decitex; total cover factor of the warp and the weft: 700 to 1400), when two surfaces of the nylon taffeta of 22 decitex are subjected to thermal compression bond with the sealing tape using the hot melt adhesive, thermal compression bond is performed by attaching the sealing tape to the hot air sealer and setting a surface temperature of the hot melt adhesive to be from 150° C. to 180° C., more preferably, 160° C. Subsequently, the heated part is left to stand to cool until a temperature thereof returns to a room temperature, thereby completing the thermal compression bond.

Hereinafter, the present invention will be explained with reference to drawings, but the present invention is not limited to the embodiments shown by the drawings. FIG. 1 is a cross section view illustrating an example of the sealing tape of the present invention. A sealing tape 1 shown by FIG. 1 is an embodiment using a porous film comprising a hydrophobic resin as a base film 3, wherein a woven fabric 5 with a total cover factor of the warp and the weft of from 500 to 1400 is laminated on one side of the base film, and an adhesive layer 7 is laminated on the other side of the base film, and the woven fabric 5 and the base film 3 are bonded with a hot melt adhesive 9. A hydrophilic resin layer 11 is formed on a side forming an adhesive layer of the porous film comprising the hydrophobic resin.

Figure 2:
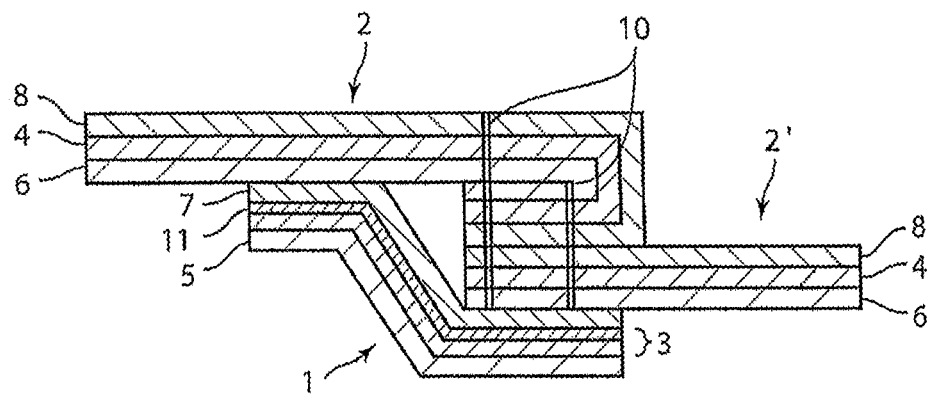
FIG. 2 is an illustration diagram exemplifying the cross section structure of the sealed portion where the sewn part has been subjected to sealing treatment.

FIG. 2 is a cross section view illustrating an example of a sewn part formed by sewing a fabric laminated product preferably used in the present invention and subjecting it to sealing treatment using the sealing tape of the present invention. In a fabric laminated product 2, one side of the flexible film 4 is laminated with a woven fabric 6 with a total cover factor of the warp and the weft of from 700 to 1400, and the other side of the film is laminated with a cloth 8. An end of the fabric laminated product 2 is folded back, and the folded part is placed over an end of another fabric laminated product 2 to be sewn with a sewing yarn 10. The sealing tape 1 is bonded in such a manner that it covers the sewn part, and a part of the hot melt adhesive layer 7 is impregnated into a surface of the woven fabric 6 laminated on the fabric laminated product 2 (figure not shown).

Figure 3:
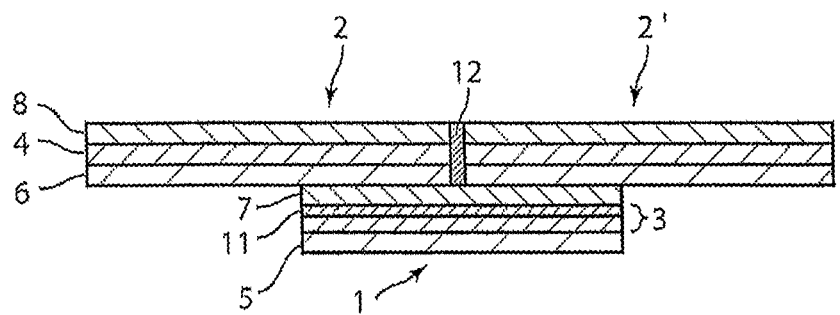
FIG. 3 is an illustration diagram exemplifying the cross section structure of the sealed portion where the fused part has been subjected to sealing treatment.

FIG. 3 is a cross section view showing an example of a frame format of a fused part formed by fusing a fabric laminated product preferably used in the present invention and subjecting it to sealing treatment using a sealing tape of the present invention. Each of a fabric laminated product 2 and a fabric laminated product 20 are fused at an end thereof to form a fused part 12, and a sealing tape 1 is bonded to cover the fused part 12.

EXAMPLES

[Evaluation Method]
1. Measurement of Weight of Sealing Tape

The sealing tape (22 mm in width) prepared in Test Example is cut in a length of 1 m to measure the mass using an electronic scale capable of measuring up to 0.01 g, and the value was rounded at the smallest digit to obtain a mass per unit length.

2. Measurement of Thickness of Sealing Tape

It was measured under a condition that no load except the spring load of the main body is applied using a dial thickness gauge of 1/1000 mm manufactured by TECLOCK, and the value was rounded at the smallest digit to obtain the thickness.

3. Tensile Strength Test of Sealing Tape

The laminated product having a three-layer structure prepared in Test Example was cut into a size of 10 mm in width and 100 mm in length, thereby carrying out a tensile test. The tensile test was performed using an autograph AGS-100A manufactured by Shimadzu Corporation under conditions of a distance between chucks of 50 mm and stretching speed of 50 mm/minute to measure the rupture strength at the time the sample started to be broken. Tensile strength at the stage of 10% elongation was set to be 10% modulus. The tensile strength test was performed with respect to both the length direction and the width direction of the sealing tape.

4. VELCRO® Abrasion Resistance Test of Sealing Tape

With respect to the sealing tape prepared in Test Example, abrasion resistance on the side laminated with the clothing fabric (the woven fabric or the knit) was evaluated. A hook side of a hook-and-loop fastener ("QUICKLON® 1QN-N20" manufactured by YKK) was attached to a friction tester of II-type friction element described in JIS L 0849 while a specimen was attached to a specimen support. The hook-and-loop fastener was attached to the friction element in a state that the hook side thereof faced the specimen side. The specimen was attached to the specimen support in a state that the side laminated with the clothing fabric (the woven fabric or the knit) of the sealing tape faced the upper surface (friction element side). Under the condition, a load of 2 N was applied to the friction element to friction 100 times, and the condition of a frictioned part of the specimen was observed. Specimens having some damage are determined as abnormal, while the specimens having no recognized damage are determined as nothing abnormal.

5. Water Resistance Test of the Sealed Portion

Water resistance test of the sealed portion was carried out using a water resistance tester ("SCHOPPER™ Type Water Penetration Tester WR-DM type" manufactured by DAIEI KAGAKU SEIKI MFG. co., ltd.) described in JIS L 1096 (low water pressure method) with respect to a specimen at an initial stage as well as after washing 20 times. A water pressure of 20 kPa was applied to the portion subjected to the sealing treatment (crossing point) from the side of the specimen subjected to sealing treatment followed by maintaining the state for 1 minute. Thereafter, in a case that water appeared on a surface of the side opposite to the side of the specimen to which the water pressure was applied, it was evaluated as fail due to poor water resistance. In a case that no water was observed, it was evaluated as pass.

The washing treatment was performed using a domestic automatic washing machine ("NA-F70PX1" manufactured by Matsushita Electric Industrial Co., Ltd.), followed by a process of hanging the specimen for drying at a room temperature for 24 hours. These two steps were determined as one cycle. The cycle was repeated 20 times before the specimen was supplied to the resistance test of the sealed portion after washing 20 times. When washing, a load cloth of 35 cm×35 cm (made of cotton shirting fabric specified by JIS L 1096, wherein a circumference thereof is stitched to prevent fray) was used in such a manner that a total amount with the clothing fabric to be the specimen is adjusted to become 300±30 g. The washing was carried out using 40 liter of tap water and 30 g of a synthetic laundry detergent ("ATTACK® " manufactured by Kao Corporation) for 6 minutes followed by rinsing twice and dewatering for 3 minutes.

6. Tensile Strength Test of the Sealed Portion

The tensile strength test of the sealed portion was performed using a material testing system "3365" manufactured by Instron. The testing conditions for the tensile test were as follows: distance between chucks: 100 mm; size of chuck: 25 mm×25 mm; and tensile speed: 50 mm/min. The strength at the time when the sample started to be broken was determined as the rupture strength for measurement.

7. Measurement of Fineness of Yarn

Based on JIS L 1096, fineness (dtex) of the warp and the weft of the woven fabric was measured. Fineness of filaments constituting the warp and the weft is calculated by dividing the fineness of the warp or the weft by the number of filaments constituting the warp or the weft.

8. Measurement of Density of Woven Fabric

Based on JIS L 1096, density of the warp and density of the weft of the woven fabric (counts/2.54 cm) were each measured.

[Production of Sealing Tape and Evaluation of Sealing Tape]

Test Example 1 (Example)

As the base film, a porous PTFE film having a mass of 33 g/m² per unit area (porosity of 80%, maximum pore size of 0.2 μm, average thickness of 30 μm manufactured by Japan Gore-Tex Inc.) was used. Next, ethylene glycol was added to a hydrophilic polyurethane resin ("HYPOL® 2000" manufactured by The Dow Chemical Company) in such a proportion that an equivalent ratio of NCO/OH becomes 1/0.9 followed by mixing and stirring, thereby preparing an application liquid of polyurethane prepolymer. The application liquid of polyurethane prepolymer was coated on one side of the porous PTFE film with a roll coater (impregnation into a part of the film surface). An amount of coating at the time was 10 g/m². Next, it was put in an oven adjusted to the temperature at 80° C. and humidity at 80% RH for one hour to cure by a reaction with moisture, thereby preparing a base film formed with a hydrophilic polyurethane resin layer on one side of the porous PTFE film.

Next, a commercially available woven fabric A made of nylon 66 having a plain weave construction with total cover factor of 1117 of the warp and the weft (the warp and the weft are false twist textured yarn each having a fineness of 17 dtex; filament number of each of the warp and the weft of 5, filament fineness of each of the warp and the weft of 3.4 dtex, density of the warp of 138/2.54 cm, density of the weft of 133/2.54 cm, mass per unit area of 19 g/m²)was subjected to bonding process on the side of the porous PTFE on which the hydrophilic polyurethane resin layer was not formed to, using a humidity curing reaction-type polyurethane hot melt adhesive ("HI-BON™ 4811" manufactured by Hitachi Kasei Polymer Co.,Ltd.). As the adhesion processing conditions, a temperature of the adhesive of the curing reaction-type polyurethane hot melt was 120° C., and a melt of the adhesive was coated on the porous PTFE film in a dot-like form using a gravure roll with a cover ratio of 60% in such a manner that a transcript amount of the adhesive became 5 g/m² followed by pressure bonding with the woven fabric using a roll. After the roll pressure bonding, it was left still in a constant temperature and humidity chamber at 60° C. and 80% for 24 hours to cure the curing reaction-type polyurethane hot melt adhesive, thereby obtaining a laminated product having a double layer structure.

Next, pellets of a polyurethane hot melt resin (LB-25M manufactured by W.L.GORE & ASSOCIATES) were extruded and coated on the side of the base film of the laminated product having the double layer structure to which the hydrophilic polyurethane resin layer was formed, using an extruder with a die temperature at 180° C. and a thickness of 100 μm, thereby obtaining a laminated product having a three-layer structure composed of the woven fabric, the base film and the polyurethane hot melt adhesive layer. Next, the laminated product of the three-layer structure was slit in a width of 22 mm while a tension of 100 N/m was applied, thereby obtaining a sealing tape.

Test Example 2 (Example)

A sealing tape was obtained by carrying out the process under the processing conditions same as in Test Example 1 except that a commercially available woven fabric B of a plain weave construction made of nylon 6 with the total cover factor of the warp and the weft of 1275 (the warp and the weft are false twist textured yarn each having a fineness of 33 dtex; the number of the filaments of the warp of 6 and the weft of 10; filament fineness of the warp of 5.5 dtex and the weft of 3.3 dtex, density of the warp of 121/2.54 cm and density of the weft of 101/2.54 cm, mass per unit area of 25 g/m$^2$) was used instead of the woven fabric A of Test Example 1.

Test Example 3 (Example)

A sealing tape was obtained by carrying out the process under the processing conditions same as in Test Example 1 except that a commercially available woven fabric C of a plain weave construction made of nylon 66 with the total cover factor of 660 (the warp and the weft are false twist textured yarn each having a fineness of 17 dtex; the number of the filaments of each of the warp and the weft of 5; filament fineness of each of the warp and the weft of 3.4 dtex; density of the warp of 95/2.54 cm and the weft of 65/2.54 cm, mass per unit area of 7 g/m$^2$) was used instead of the woven fabric A of Test Example 1, that a non-porous polyester film (FLECTRON® film-type M manufactured by OG Corporation, thickness of 15 μm) was used as the base film and that the hydrophilic polyurethane resin layer was not formed.

Test Example 4 (Example)

A sealing tape was obtained by carrying out the process under the processing conditions same as in Test Example 1 except that the thickness of the polyurethane hot melt adhesive layer was changed to 150 μm.

Test Example 5 (Comparative Example)

A sealing tape was obtained by carrying out the process under the processing conditions same as in Test Example 1 except that a commercially available tricot knit D made of nylon 66 fiber (fineness of both the wale and the course of 22 dtex; wale density of 36/2.54 cm: course density of 50/2.54 cm, mass per unit area of 33 g/m$^2$) instead of the woven fabric A of Test Example 1 and that the thickness of the polyurethane hot melt adhesive layer was changed to 150 μm and the tension during slit processing was changed to 65 N/m.

Test Example 6 (Comparative Example)

A sealing tape was obtained by carrying out the process under the processing conditions same as in Test Example 1 except that the thickness of the polyurethane hot melt adhesive layer of Test Example 5 was changed to 100 μm and the tension during the slit processing was changed to 65 N/m.

Test Example 7 (Comparative Example)

A sealing tape was obtained by carrying out the process under the processing conditions same as in Test Example 1 except that a commercially available woven fabric E of a plain weave construction made of nylon 66 with the total cover factor of each of the warp and the weft of 1526 (the warp and the weft are false twist textured yarn each having a fineness of 17 dtex; filament number of each of the warp and the weft of 5; filament fineness of each of the warp and the weft of 3.4 dtex ; density of the warp of 178/2.54 cm and the weft of 192/2.54 cm ; mass per unit area of 27 g/m$^2$) instead of the woven fabric A of Test Example 1, and that a non-porous polyester film (FLECTRON® film-type M manufactured by OG Corporation; thickness of 15 μm) were used as the base film and that the hydrophilic polyurethane resin layer was not formed.

Test Example 8 (Comparative Example)

A sealing tape was obtained by carrying out the process under the processing conditions same as in Test Example 1 except that a commercially available woven fabric F of a plain weave construction made of nylon 6 with the total cover factor of the warp and the weft of 1436 (the warp and the weft are false twist textured yarn each having a fineness of 33 dtex, filament number of the warp of 6 and the weft of 10, filament fineness of the warp of 5.5 dtex and the weft of 3.3 dtex, density of the warp of 126/2.54 cm and density of the weft of 124/2.54 cm, mass per unit area of 28 g/m$^2$) was used instead of the woven fabric A of Test Example 1.

Test Example 9 (Comparative Example)

Lamination with the porous PTFE film was attempted using a commercially available woven fabric G of a plain weave construction made of nylon 66 with the total cover factor of the warp and the weft of 491 (the warp and the weft are false twist textured yarn each having a fineness of 17 dtex, filament number of each of the warp and the weft of 5, density of the warp of 65/2.54 cm and the weft of 54/2.54 cm, mass per unit area of 5 g/m$^2$) instead of the woven fabric A of Test Example 1; since the woven fabric G lacked elasticity, it was impossible to handle it for lamination processing, so that a laminated product could not be obtained.

Constitutions of the sealing tapes prepared in Test Example 1 to 8 are shown in Table 1. Results of evaluation of mass per unit length, thickness, tensile strength, VEL-CRO® abrasion resistance with respect to the sealing tapes of Example 1 to 8 are summarized in Table 2.

TABLE 1

| Example | Fabric | Abbr. | Fineness of yarn (dtex) Warp | Weft | Fineness of filaments (dtex) Warp | Weft | Density (counts/2.54 cm) Warp | Weft | CFm | CFt | CFTotal | Base film | Thickness of hot melt (μm) | Tape width (mm) |
|---|---|---|---|---|---|---|---|---|---|---|---|---|---|---|
| 1 | Woven fabric | A | 17 | 17 | 3.4 | 3.4 | 138 | 133 | 569 | 548 | 1117 | PorousPTFE | 100 | 22 mm |
| 2 | Woven fabric | B | 33 | 33 | 5.5 | 3.3 | 121 | 101 | 695 | 580 | 1275 | PorousPTFE | 100 | 22 mm |
| 3 | Woven fabric | C | 17 | 17 | 3.4 | 3.4 | 95 | 65 | 392 | 268 | 660 | Non-porous polyester | 100 | 22 mm |
| 4 | Woven fabric | A | 17 | 17 | 3.4 | 3.4 | 138 | 133 | 569 | 548 | 1117 | PorousPTFE | 150 | 22 mm |
| 5 | Tricot knit | D | — | — | — | — | 36 | 50 | — | — | — | PorousPTFE | 150 | 22 mm |
| 6 | Tricot knit | D | — | — | — | — | 36 | 50 | — | — | — | PorousPTFE | 100 | 22 mm |
| 7 | Woven fabric | E | 17 | 17 | 3.4 | 3.4 | 178 | 192 | 734 | 792 | 1526 | Non-porous polyester | 100 | 22 mm |
| 8 | Woven fabric | F | 33 | 33 | 5.5 | 3.3 | 126 | 124 | 724 | 712 | 1436 | PorousPTFE | 100 | 22 mm |
| 9 | Woven fabric | G | 17 | 17 | 3.4 | 3.4 | 65 | 54 | 268 | 223 | 491 | — | — | — |

TABLE 2

| Example | Mass per unit length (g/m) | Thickness (mm) | 10% modulus (N/cm) Length direction | Width direction | Tensile strength (Width direction) (N/cm) | Velcro abrasion resistance |
|---|---|---|---|---|---|---|
| 1 | 3.7 | 0.22 | 14.0 | 13.2 | 49.7 | Nothing abnormal |
| 2 | 3.8 | 0.23 | 16.8 | 16.8 | 57.4 | Nothing abnormal |
| 3 | 3.1 | 0.20 | 10.6 | 10.6 | 28.6 | Nothing abnormal |
| 4 | 4.9 | 0.27 | 15.6 | 13.8 | 51.1 | Nothing abnormal |
| 5 | 5.4 | 0.35 | 5.9 | 4.8 | 30.4 | Abnormal (scars) |
| 6 | 4.2 | 0.30 | 4.9 | 4.5 | 28.5 | Abnormal (scars) |
| 7 | 3.5 | 0.22 | 20.6 | 18.7 | 69.5 | Nothing abnormal |
| 8 | 3.8 | 0.23 | 24.2 | 16.3 | 77.5 | Nothing abnormal |

*) Water resistance of sealed portion was evaluated at a crossing point.

<Regarding Mass>

As clearly seen from Table 2, the tapes using the tricot knit in Test Example 5 and 6 has a large mass compared with the sealing tape of the present invention (Test Examples 1 to 4) having the same thickness of the hot melt adhesive layer. Accordingly, the sealing tape of the present invention is found to be excellent in lightweight properties.

<Regarding Thickness>

The tape using the tricot knit in Test Example 5 and 6 has a larger thickness compared with other tapes. From this result, it is found that the sealing tape of the present invention is preferably applied to a garment which is required to have portability.

<Regarding Tensile Strength>

10% modulus and tensile strength of the sealing tape of the present invention is excellent compared with 10% modulus and tensile strength of the sealing tape laminated with the tricot knit in Test Example 5 and 6. From the result, it is considered that the sealing tape of the present invention is less likely to cause necking during a slit processing and a sealing process, excellent in productivity and stability of the width of the tape compared with a conventional sealing tape obtained by laminating a tricot knit, and that it can also enhance strength of a joint of the textile product.

<<Regarding VELCRO® Abrasion Resistance>>

As clearly seen from Table 2, no abnormality could be found in the sealing tape of the present invention (Test Example 1 to 4), and the tape exhibited excellent abrasion resistance. On the other hand, scars were formed in Test Example 5 and 6 laminated with the tricot knit, which leaded to lowering of waterproof property, so that in a case of using VELCRO® fastening for a garment, there is a possibility that waterproof property of the garment will be lost.

Figure 4:
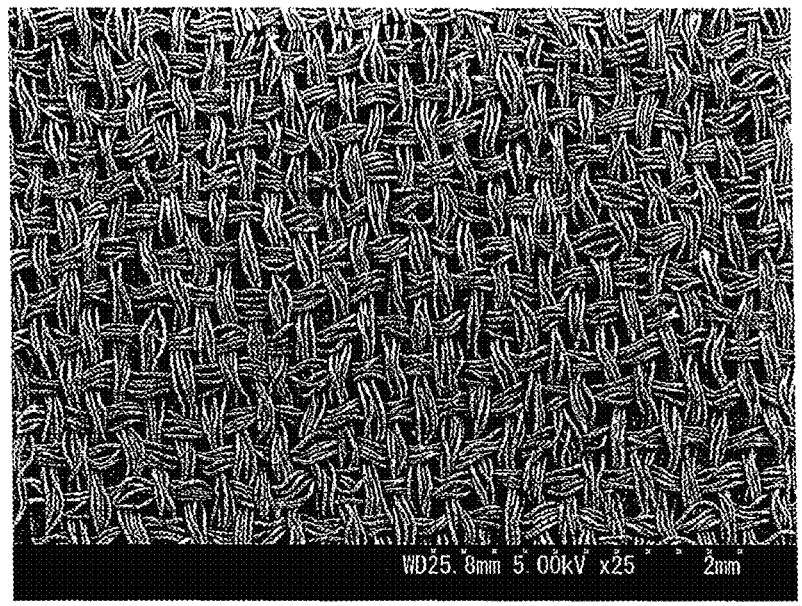
FIG. 4 is an electron microscope photograph of the woven fabric used for the sealing tape of Test Example 1.
Figure 5:
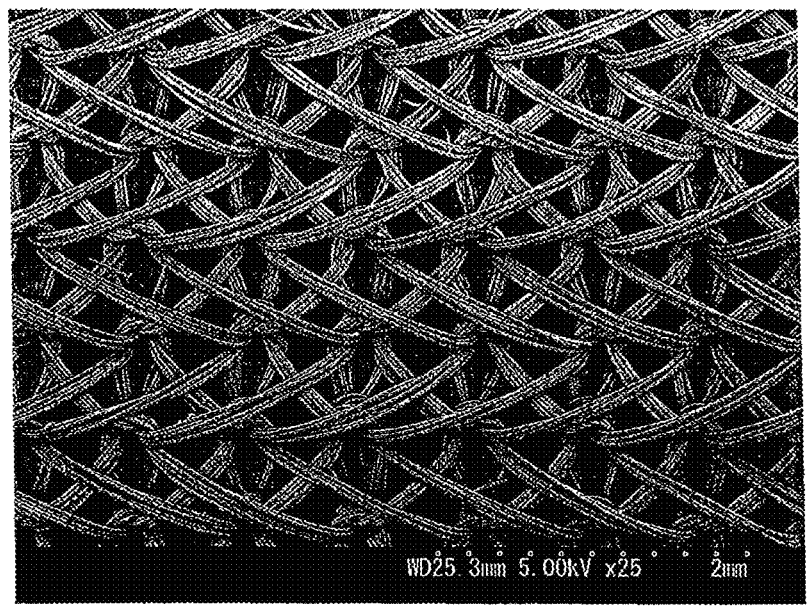
FIG. 5 is an electron microscope photograph of the tricot knit used for the sealing tape of Test Example 5.

FIG. 4 shows an electron microscope photograph of the woven fabric used in Test Example 1, and FIG. 5 shows an electron microscope photograph of the tricot knit used in Test Example 5.

[Production of Textile Product and Evaluation of Textile Product]

The fabric laminated product was processed into a textile product using a sealing tape of Test Example 1 to 8 to test a performance of the sealing tape.

1. Production of Fabric Laminated Product 1-1. Production of Fabric Laminated Product AH As a flexible waterproof and moisture-permeable film, a porous PTFE film having a mass per unit area of 33 g/m² (manufactured by Japan Gore-Tex Inc. having a porosity of 80%, maximum pore size of 0.2 μm and an average thickness of 30 μm) was used, and as a woven fabric laminated on the side to be subjected to sealing treatment during processing into a textile product, a commercially available woven fabric A made of nylon 66 having a plain weave construction with the total cover factor of 1117 of the warp and the weft (the warp and the weft are false twist textured yarn each having a fineness of 17 dtex; filament number of each of the warp and the weft of 5, filament fineness of each of the warp and the weft of 3.4 dtex, density of the warp of 138/2.54 cm and density of the weft of 133/2.54 cm, mass per unit area of 19 g/m²) was used, and as the cloth laminated on the other side, a commercially available woven fabric H made of nylon 66 having a plain weave construction (the warp and the weft are false twist textured yarn each having a fineness of 17 dtex, density of the warp of 165/2.54 cm and density of the weft of 194/2.54 cm, mass per unit area of 27 g/m$^2$) was used. As the hydrophilic resin for impregnation treatment of the porous PTFE film, an application liquid of polyurethane prepolymer was prepared by adding ethylene glycol to a hydrophilic polyurethane resin ("HYPOL® 2000" manufactured by The Dow Chemical Company) in such a proportion that an equivalent ratio of NCO/OH became 1/0.9 followed by mixing and stirring.

The application liquid of polyurethane prepolymer was coated on one surface of the porous PTFE film using a roll coater (impregnation into a part of the film surface). The amount of coating at the time was 10 g/m$^2$. Next, it was put in an oven wherein a temperature was adjusted at 80° C. and humidity at 80% RH for one hour to cure by a reaction with moisture, thereby forming a hydrophilic polyurethane resin layer on one surface of the porous PTFE film. The woven fabric A was laminated on the side of the porous PTFE film on which side the hydrophilic polyurethane resin layer was formed, while woven fabric H was laminated on the other side.

For bonding the woven fabric A, H and the porous PTFE film, a humidity curing reaction-type polyurethane hot melt adhesive ("HI-BON™ 4811" manufactured by Hitachi Kasei Polymer Co., Ltd.) was used. A temperature of the curing reaction-type polyurethane hot melt adhesive was set at 120° C., and a melt of the adhesive was coated on the porous PTFE film in such a manner that a transcript amount of the adhesive became 5 g/m$^2$, using a gravure roll with a cover ratio of 40% in a dot-like form, followed by pressure bonding using a roll. After the roll pressure bonding, it was left in a constant temperature and humidity chamber at 60° C. and 80% RH for 24 hours to cure the curing reaction-type polyurethane hot melt adhesive, thereby obtaining a fabric laminated product of a three-layer structure. Next, a water-repellent treatment of a woven fabric H of a fabric laminated product having a three-layer structure was performed. A dispersion liquid which was a mixture of 3 mass % of a water repellant "ASAHI GUARD® AG7000" manufactured by Meisei Chemical Works, Ltd.) and 97 mass % of water was prepared and was coated on a surface of the woven fabric H using a kiss coater in a saturation amount or more, and then, an excessive dispersion liquid was squeezed out using a mangle roll. At the time, an amount of the coated dispersion liquid absorbed in the woven fabric was about 20 g/m$^2$. Further, the clothing fabric was dried with a hot-air circulation-type oven under conditions of 130° C. for 30 seconds, thereby obtaining a fabric laminated product AH having a three-layer structure subjected to water-repellent treatment.

1-2 Production of Fabric Laminated Product DH

A fabric laminated product DH having a three-layer structure was obtained by carrying out the same process as the fabric laminated product AH except that a commercially available tricot knit D composed of nylon 66 fiber (fineness of each of the wale and the course of 22 dtex, wale density of 36/2.54 cm, course density of 50/2.54 cm, mass per unit area of 33 g/m$^2$) was used instead of the woven fabric A laminated on the side subjected to sealing treatment in the laminated product AH, and that transcript amount of the adhesive at the time of lamination was changed to 8 g/m$^2$.

The constitutions of the fabric laminated products AH and DH prepared as above are shown in Table 3. Additionally, a joint was prepared by the following method using each of the fabric laminated products AH and DH.

TABLE 3

| Laminated product | Face fabric | Flexible film | Backing material | Fineness of backing material (dtex) | | Density of backing material (counts/2.54 cm) | | CFm | CFt | Cftotal |
| --- | --- | --- | --- | --- | --- | --- | --- | --- | --- | --- |
| | | | | Warp | Weft | Warp | Weft | | | |
| AH | H (Woven fabric) | Porous PTFE + hydrophilic PU treatment | A (Woven fabric) | 17 | 17 | 138 | 133 | 569 | 548 | 1117 |
| DH | H (Woven fabric) | Porous PTFE + hydrophilic PU treatment | D (Tricot) | — | — | 36 | 50 | — | — | — |

2. Production of Bonded Structure 2-1. Bonded Structure by Sewing (Sewing Machine)

<For Water Resistancetest of the Sealed Portion>

Each of the fabric laminated products AH and DH were cut into a size of 300 mm×300 mm, and the clothing fabric was further cut at a center thereof into a shape of a cross, thereby preparing four pieces of specimen of a same size in square shape. In order that each of them formed the previous shape, double stitch treatment was carried out in parallel to an end of the stitch using a polyester sewing yarn (yarn count of 50) with a width of the seam of 7 mm while the seam was turned down, thereby preparing a specimen having a cross-shaped stitch (sewn part) at the center thereof (FIG. 6 (a)).

<For Tensile Strength Test of the Sealed Portion>

Each of the fabric laminated product AH and DH was used to prepare a specimen having a width of 100 mm and a length of 200 mm, wherein a linear sewn part was provided in the central region in a length direction.

Figure 6A:
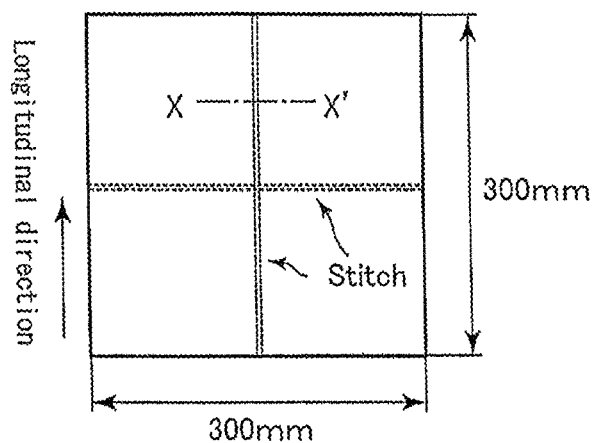
FIG. 6 is an illustration diagram exemplifying the specimen having a sewn part of the water resistance test of the sealed portion.
Figure 6B:
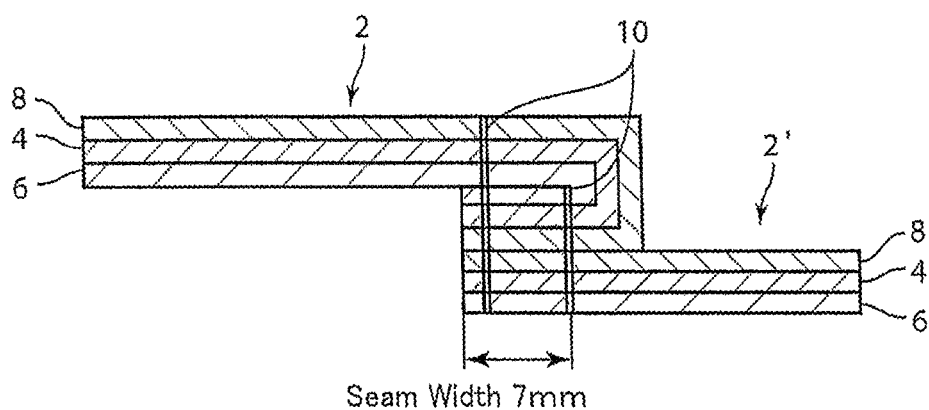

With respect to the sewing, all the specimens were, as shown in FIG. 6 (b), subjected to double stitch treatment in parallel to an end of the stitch while the seam had a width of 7 mm and was turned down. A polyester sewing yarn (yarn count of 50) was used for the sewing yarn.

2-2. Bonded Structure by Ultrasound Fusion <For Water Resistance Test of the Sealed Portion>

Each of the fabric laminated products AH and DH was cut into a size of 300 mm×300 mm, and the clothing fabric was further cut at a center thereof into a shape of cross, thereby preparing four pieces of specimen of a same size in square shape. They were fused so as to form a shape before being cut, thereby preparing specimen having a fused part as a joint (FIG. 7 (a)).

<For Tensile Strength Test of the Sealed Portion>

As the specimen supplied to the tensile strength test of the sealed portion, a specimen with a size of 100 mm in width and 200 mm in length provided with a linear fused part at the central portion in length direction was prepared.

Figure 7A:
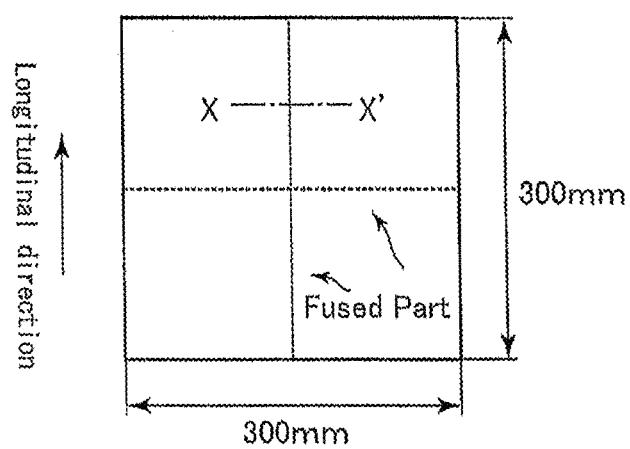
FIG. 7 is an illustration diagram exemplifying the specimen having the fused part for the water resistance test of the sealed portion.
Figure 7B:
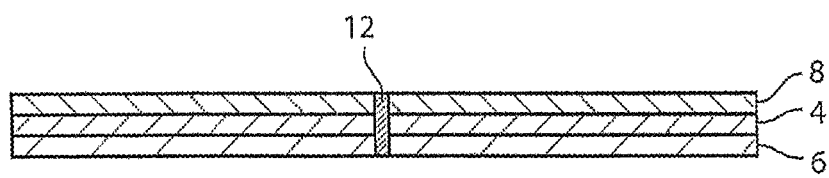

Each of the specimens was fused with a ultrasound sealer (US1170 manufactured by Brother Industries, Ltd.) using a fusion blade having an end radius of 0.1 mm at a process speed of 3.0 m/min while the ends of the fabric laminated product were fused to be bonded. FIG. 7 (*b*) shows a pattern diagram of the cross section structure of the fused part.

2-3. Sealing Treatment

The sealing tape was superimposed in such a manner that it covered joints of these specimens using a hot air sealer ("5000E" manufactured by W.L.GORE & ASSOCIATES), and a sealing treatment was carried out at a preset temperature of 700° C. and a process speed of 4 m/minute.

At the center of the specimen supplied to water resistance test of the sealed portion, a crossing point wherein the sealing tapes were crossed was formed.

Test Example 10

Each of a sewn part and a fused part of the clothing fabric A side of the specimen prepared using the fabric laminated product AH were subjected to sealing treatment using a sealing tape of Test Example 1, thereby preparing a specimen for the water resistance test of the sealed portion and the tensile strength test of the sealed portion. The sealing treatment was performed using a hot air sealer ("5000E" manufactured by W.L. GORE ASSOCIATES) under the conditions of preset temperature at 700° C., and a process speed at 4 m/minute.

Test Example 11

The specimen to be provided for the water resistance test of the sealed portion and the tensile strength test of the sealed portion was prepared by carrying out the processing under the same processing conditions as in Test Example 10 except that the sealing tape in Test Example 10 was replaced with the sealing tape prepared in Test Example 2.

Test Example 12

The specimen to be provided for the water resistance test of the sealed portion and the tensile strength test of the sealed portion was prepared by carrying out the processing under the same processing conditions as in Test Example 10 except that the sealing tape in Test Example 10 was replaced with the sealing tape prepared in Test Example 3.

Test Example 13

The specimen to be provided for the water resistance test of the sealed portion and the tensile strength test of the sealed portion was prepared by carrying out the processing under the same processing conditions as in Test Example 10 except that the sealing tape in Test Example 10 was replaced with the sealing tape prepared in Test Example 4.

Test Example 14

The specimen to be provided for the water resistance test of the sealed portion and the tensile strength test of the sealed portion was prepared by carrying out the processing under the same processing conditions as in Test Example 10 except that the sealing tape in Test Example 10 was replaced with the sealing tape prepared in Test Example 5.

Test Example 15

The specimen to be provided for the water resistance test of the sealed portion and the tensile strength test of the sealed portion was prepared by carrying out the processing under the same processing conditions as in Test Example 10 except that the sealing tape in Test Example 10 was replaced with the sealing tape prepared in Test Example 6.

Test Example 16

The specimen to be provided for the water resistance test of the sealed portion and the tensile strength test of the sealed portion was prepared by carrying out the processing under the same processing conditions as in Test Example 10 except that the sealing tape in Test Example 10 was replaced with the sealing tape prepared in Test Example 7.

Test Example 17

The specimen to be provided for the water resistance test of the sealed portion and the tensile strength test of the sealed portion was prepared by carrying out the processing under the same processing conditions as in Test Example 10 except that the sealing tape in Test Example 10 was replaced with the sealing tape prepared in Test Example 8.

Test Example 18

Each of a sewn part and a fused part of the clothing fabric D side of the specimen prepared using the fabric laminated product DH were subjected to sealing treatment using the sealing tape of Test Example 1, thereby preparing specimens for the water resistancetest of the sealed portion and the tensile strength test of the sealed portion. The sealing treatment was carried out using a hot air sealer ("5000E" manufactured by W.L.GORE ASSOCIATES) under the conditions of a preset temperature at 700° C. and a processing speed at 4 m/minute.

Test Example 19

The specimen to be provided for the water resistance test of the sealed portion and the tensile strength test of the sealed portion was prepared by carrying out the processing under the same processing conditions as in Test Example 18 except that the sealing tape in Test Example 18 was replaced with the sealing tape prepared in Test Example 2.

Test Example 20

The specimen to be provided for the water resistance test of the sealed portion and the tensile strength test of the sealed portion was prepared by carrying out the processing under the same processing conditions as in Test Example 18 except that the sealing tape in Test Example 18 was replaced with the sealing tape prepared in Test Example 3.

Test Example 21

The specimen to be provided for the water resistance test of the sealed portion and the tensile strength test of the sealed portion was prepared by carrying out the processing under the same processing conditions as in Test Example 18 except that the sealing tape in Test Example 18 was replaced with the sealing tape prepared in Test Example 4.

Test Example 22

The specimen to be provided for the water resistance test of the sealed portion and the tensile strength test of the sealed portion was prepared by carrying out the processing under the same processing conditions as in Test Example 18 except that the sealing tape in Test Example 18 was replaced with the sealing tape prepared in Test Example 5.

Test Example 23

The specimen to be provided for the water resistance test of the sealed portion and the tensile strength test of the sealed portion was prepared by carrying out the processing under the same processing conditions as in Test Example 18 except that the sealing tape in Test Example 18 was replaced with the sealing tape prepared in Test Example 6.

Test Example 24

The specimen to be provided for the water resistance test of the sealed portion and the tensile strength test of the sealed portion was prepared by carrying out the processing under the same processing conditions as in Test Example 18 except that the sealing tape in Test Example 18 was replaced with the sealing tape prepared in Test Example 7.

Test Example 25

The specimen to be provided for the water resistance test of the sealed portion and the tensile strength test of the sealed portion was prepared by carrying out the processing under the same processing conditions as in Test Example 18 except that the sealing tape in Test Example 18 was replaced with the sealing tape prepared in Test Example 8.

With respect to the specimen subjected to sealing treatment obtained in Test Example 10 to 25, a water resistance test of the sealed portion and a tensile strength test of the sealed portion were performed. The result is shown in table 4.

On the other hand, in Test Examples 16 and 17 using the sealing tape wherein the woven fabric laminated on the base film had a cover factor of 1400 or more, water resistance of the crossing point was low from an initial stage, so that waterproof effect could not be obtained. It is probably because, in the sealing tape wherein the woven fabric laminated has a cover factor of 1400 or more, density of the woven fabric is too high, so that at the crossing point of the sealing tapes, impregnation of the hot melt adhesive of the sealing tape of the second layer into the woven fabric laminated in the sealing tape of the first layer was lowered, thereby lowering a sealing effect. Additionally, in Test Examples 14 and 15 using the sealing tape laminated with the tricot knit on the base film, although initial water resistance is good, after washing 20 times, water resistance of Test Example 15 using the sealing tape having a hot melt adhesive layer with the thickness of 100 μm was lowered. It is probably because, since the thickness of the tricot knit was thicker than the thickness of the woven fabric of the present invention, the hot melt adhesive layer having the thickness of 100 μm could not impregnate into the inside of the tricot knit sufficiently, thereby lowering the sealing effect.

Looking at the evaluation results of water resistance against the fabric laminated product DH, initial water resistance was good in all of the Test Examples 18 to 21 wherein sealing treatment was carried out using the sealing tape of the present invention. However, water resistance after washing 20 times in Test Examples 18 to 20 was poor, and good resistance was obtained only in Test Example 21 using the sealing tape having the hot melt adhesive layer with the thickness of 150 μm. It is probably because the clothing fabric on the side of treating the sealing tape of the fabric laminated product DH was a tricot knit, so that a space inside

TABLE 4

| Example | Constitution of fiber-laminated product | Sealing tape Example | Sealing tape Laminated fabric | Sealing tape Thickness of hot melt | Water resistance of sealed portion (initial period) Sewn part | Water resistance of sealed portion (initial period) Fused part | Water resistance of sealed portion (after washing for 20 times) Sewn part | Water resistance of sealed portion (after washing for 20 times) Fused part | Tensile strength of sealed portion (N) Sewn part | Tensile strength of sealed portion (N) Fused part |
|---|---|---|---|---|---|---|---|---|---|---|
| 10 | AH | 1 | Woven fabric | 100 | Pass | Pass | Pass | Pass | 235 | 118 |
| 11 | AH | 2 | Woven fabric | 100 | Pass | Pass | Pass | Pass | 226 | 156 |
| 12 | AH | 3 | Woven fabric | 100 | Pass | Pass | Pass | Pass | 201 | 111 |
| 13 | AH | 4 | Woven fabric | 150 | Pass | Pass | Pass | Pass | 240 | 120 |
| 14 | AH | 5 | Tricot knit | 150 | Pass | Pass | Pass | Pass | 254 | 58 |
| 15 | AH | 6 | Tricot knit | 100 | Pass | Pass | Fail | Fail | 252 | 61 |
| 16 | AH | 7 | Woven fabric | 100 | Fail | Fail | — | — | 331 | 215 |
| 17 | AH | 8 | Woven fabric | 100 | Fail | Fail | — | — | 315 | 165 |
| 18 | DH | 1 | Woven fabric | 100 | Pass | Pass | Fail | Fail | 225 | 118 |
| 19 | DH | 2 | Woven fabric | 100 | Pass | Pass | Fail | Fail | 218 | 125 |
| 20 | DH | 3 | Woven fabric | 100 | Pass | Pass | Fail | Fail | 195 | 110 |
| 21 | DH | 4 | Woven fabric | 150 | Pass | Pass | Pass | Pass | 245 | 145 |
| 22 | DH | 5 | Tricot knit | 150 | Pass | Pass | Pass | Pass | 218 | 64 |
| 23 | DH | 6 | Tricot knit | 100 | Pass | Pass | Fail | Fail | 209 | 54 |
| 24 | DH | 7 | Woven fabric | 100 | Fail | Fail | — | — | 305 | 220 |
| 25 | DH | 8 | Woven fabric | 100 | Fail | Fail | — | — | 301 | 165 |

*) Water resistance of sealed portion was evaluated at a crossing point

<Water Resistance of Sealed Portion>

As clearly seen from Table 4, in each of Test Examples 10 to 13 using the sealing tape wherein the cover factor of the woven fabric laminated on the base film is from 500 to 1400, water resistance of the crossing point both at an initial stage and after washing 20 times against the fabric laminated product AH was good, indicating excellent waterproof property.

the tricot knit could not be filled with a hot melt adhesive layer having a thickness of 100 μm, and thus sufficient sealing effect could not be obtained.

<Tensile Strength of Sealed Portion>

Looking at the results of the tensile strength of the sealed portion, it is found that a good strength was maintained in all of the Test Examples in a case of sewing using a sewing machine. On the other hand, in a case of bonding by ultrasound fusion, strength thereof varies considerably due to difference of the sealing tape. In Test Examples 14 and 15, and 22 and 23 using a sealing tape laminated with tricot knit, a tensile strength thereof became approximately 60 N, which is a strength that is difficult to apply to a garment. On the other hand, tensile strength in all of Test Example 10 to 13 and Test Examples 18 to 21 using the sealing tape of the present invention was more than 100 N; it was possible to retain a sufficiently high strength compared with a sealing tape laminated with tricot knit. The value of 100 N is not high compared with a conventional sewing method using a sewing machine, but it is a strength that can be sufficiently applied to a usage of a garment pursuing lightweight properties and a general clothing.

<Appearance of Sealing Tape>

With respect to bonded sample subjected to sealing treatment, appearance of the side of the sealing treatment in Test Examples 10 to 25 was observed. In Test Examples 10 to 13, a boundary between the backer fabric (clothing fabric A side) of the fabric laminated product and the sealing tape was inconspicuous, which was good in appearance.

On the other hand, in Test Examples 14 to 15, 18 to 21, and 24 to 25, since an appearance of texture of the sealing tape and an appearance of the inner fabric (on the side subjected to sealing treatment) of the fabric laminated product were different, appearance of the sealing tape became conspicuous.

In Test Examples 22 and 23, the sealing tape subjected to sealing process in length direction and a backer fabric of a fabric laminated product has a same direction of the stitches, so that a boundary between the surface of the backer fabric (clothing fabric D side) and the sealing tape was inconspicuous. However, the sealing tape subjected to sealing treatment in the direction perpendicular to the length direction and the backer fabric of the fabric laminated product have different directions of the stitches, so that the sealing tape appeared to be conspicuous. If the sealing tape is likely to be conspicuous, it cannot be said that appearance of the side subjected to sealing treatment is good when a garment is produced.

2-4. Evaluation in Clothes

The fabric laminated product AH and the sealing tape of Test Examples 1 and 5 were each combined to prepare an outdoor jacket. The sealing tape in a length of 15 m was required for one jacket. The outdoor jacket using the sealing tape of the present invention (Test Example 1) was lighter by 26 g than the outdoor jacket using the sealing tape of Test Example 5. Additionally, the sealing tape was inconspicuous and had good appearance.

INDUSTRIAL APPLICABILITY

The present invention can be preferably applied to a sealing treatment for textile products, and can be preferably applied to various textile products such as garments, sheets, tents, and sleeping bags. In particular, it is preferable for garments which are required to have waterproof property and moisture permeability.

The invention claimed is:

1. A sealing tape for a garment comprising:
   a base film comprising a porous polytetrafluoroethylene film,
   a woven fabric laminated on one side of the base film, and
   an adhesive layer laminated on another side of the base film,
   wherein the woven fabric has a total cover factor ($CF_{total}$) of from 500 to 1400, calculated from the cover factors of a warp and a weft constituting the woven fabric according to the following formula:

$$CF_{total} = CF_m + CF_t$$

$$CF_m = \sqrt{F_m} \times D_m$$

$$CF_t = \sqrt{F_t} \times D_t \quad \text{[Formula 1]}$$

$CF_m$: cover factor of the warp
   $CF_t$: cover factor of the weft
   $F_m$: fineness (dtex) of the warp
   $F_t$: fineness (dtex) of the weft
   $D_m$: density of the warp (counts/2.54 cm)
   $D_t$: density of the weft of the woven fabric (counts/2.54 cm),
   wherein at least one of the warp and the weft constituting the woven fabric is composed of two or more filament materials,
   wherein an adhesive of said adhesive layer is a hot melt adhesive, and
   wherein said sealing tape seals a sewn or fused portion of a garment.

2. The sealing tape according to claim 1, wherein at least one of the cover factor ($CF_m$) of the warp and the cover factor of the weft ($CF_t$) is in a range from 200 to 800.

3. The sealing tape according to claim 1, wherein a fineness of the filament is 12 dtex or less.

4. The sealing tape according to claim 1, wherein at least one of the warp and the weft constituting the woven fabric is a textured yarn.

5. The sealing tape according to claim 1, wherein the woven fabric has a plain weave construction.

6. The sealing tape according to claim 1, wherein the polytetrafluoroethylene film has a hydrophilic resin layer on a side to which the adhesive layer is laminated.

7. The sealing tape according to claim 1, wherein the hot melt adhesive is a polyurethane resin.

8. The sealing tape according to claim 1, wherein the adhesive layer has a thickness of 120 μm or less.

9. The sealing tape according to claim 1, wherein the sealing tape has a 10% modulus of 10 to 50 N/cm along a length direction thereof.

10. A textile product prepared by sewing a fabric laminated product, wherein at least a part of the sewn part is subjected to a sealing treatment with the sealing tape according to claim 1.

11. The textile product according to claim 10, wherein the textile product is a garment.

12. The textile product according to claim 10, wherein the fabric laminated product comprises a flexible film, a woven fabric laminated to one side of the flexible film, and a cloth laminated on another side of the flexible film, wherein the woven fabric has a total cover factor ($CF_{total}$) of from 700 to 1400, calculated from the cover factors of a warp and a weft constituting the woven fabric according to a following formulae, and wherein the woven fabric side of the fabric laminated product is subjected to the sealing treatment $$CF_{total} = CF_m + CF_t$$

$$CF_m = \sqrt{F_m} \times D_m$$

$$CF_t = \sqrt{F_t} \times D_t \quad \text{[Formula 2]}$$

$CF_m$: cover factor of the warp
   $CF_t$: cover factor of the weft
   $F_m$: fineness (dtex) of the warp
   $F_t$: fineness (dtex) of the weft
   $D_m$: density of the warp (counts/2.54 cm)
   $D_t$: density of the weft (counts/2.54 cm).

13. The textile product according to claim 12, wherein at least one of the cover factor of the warp ($CF_m$) and the cover factor ($CF_t$) of the weft is in a range from 300 to 800.

14. The textile product according to claim 13, wherein the flexible film is a waterproof and moisture-permeable film.

15. The textile product according to claim 12, wherein the flexible film is a waterproof and moisture-permeable film.

16. The textile product according to claim 15, wherein the waterproof and moisture-permeable film is a porous polytetrafluoroethylene film.

17. A textile product prepared by fusing a fabric laminated product, wherein at least a part of a fused part is subjected to a sealing treatment with the sealing tape according to claim 1.

18. The textile product according to claim 17, wherein the textile product is a garment.

19. The textile product according to claim 17, wherein the fabric laminated product comprises a flexible film, a woven fabric laminated to one side of the flexible film, and a cloth laminated on another side of the flexible film, wherein the woven fabric has a total cover factor ($CF_{total}$) of from 700 to 1400, calculated from the cover factors of a warp and a weft constituting the woven fabric according to a following formulae, and wherein the woven fabric side of the fabric laminated product is subjected to the sealing treatment $$CF_{total}=CF_m+CF_t$$

$$CF_m=\sqrt{F_m}\times D_m$$

$$CF_t=\sqrt{F_t}\times D_t \quad \text{[Formula 2]}$$

$CF_m$: cover factor of the warp
$CF_t$: cover factor of the weft
$F_m$: fineness (dtex) of the warp
$F_t$: fineness (dtex) of the weft
$D_m$: density of the warp (counts/2.54 cm)
$D_t$: density of the weft (counts/2.54 cm).

20. The textile product according to claim 19, wherein at least one of the cover factor of the warp ($CF_m$) and the cover factor ($CF_t$) of the weft is in a range from 300 to 800.

* * * * *